United States Patent
Ukai et al.

(10) Patent No.: US 9,097,334 B2
(45) Date of Patent: Aug. 4, 2015

(54) METHOD FOR CAULKING RING GEAR, CAULKING TOOL USED FOR METHOD FOR CAULKING RING GEAR, AND RING GEAR

(75) Inventors: Yoshihiko Ukai, Nagoya (JP); Makoto Taniguchi, Susono (JP); Hirokazu Tsunekawa, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 127 days.

(21) Appl. No.: 13/808,313

(22) PCT Filed: Jul. 7, 2010

(86) PCT No.: PCT/JP2010/061528
§ 371 (c)(1),
(2), (4) Date: Jan. 4, 2013

(87) PCT Pub. No.: WO2012/004866
PCT Pub. Date: Jan. 12, 2012

(65) Prior Publication Data
US 2013/0112026 A1 May 9, 2013

(51) Int. Cl.
| | |
|---|---|
| *F16H 48/08* | (2006.01) |
| *F16H 55/17* | (2006.01) |
| *B21K 25/00* | (2006.01) |
| *B23P 11/00* | (2006.01) |
| *B21K 21/12* | (2006.01) |
| *F16H 48/38* | (2012.01) |

(52) U.S. Cl.
CPC ............... *F16H 55/17* (2013.01); *B21K 21/12* (2013.01); *B21K 25/00* (2013.01); *B23P 11/005* (2013.01); *F16H 2048/382* (2013.01); *F16H 2048/385* (2013.01); *Y10T 74/1987* (2015.01); *Y10T 156/10* (2015.01)

(58) Field of Classification Search
USPC ................ 475/220, 230, 248, 331; 74/606 R; 29/505, 509, 512, 513, 893.2; 403/278
See application file for complete search history.

(56) References Cited

U.S. PATENT DOCUMENTS 4,974,309 A 12/1990 Hattori et al.
5,320,587 A 6/1994 Bodtker et al.
(Continued)

FOREIGN PATENT DOCUMENTS

EP 0647789 B1 5/2000
FR 2580349 A1 * 10/1986
(Continued)

OTHER PUBLICATIONS

Office Action of Oct. 21, 2014, in U.S. Appl. No. 13/701,691.
(Continued)

*Primary Examiner* — Roger Pang
(74) *Attorney, Agent, or Firm* — Kenyon & Kenyon LLP

(57) ABSTRACT

Disclosed is a caulking tool used for a ring gear press-fit in the outer periphery of a flange of a differential case constituting a differential subassembly, in order to caulk a caulking portion provided on at least either end of the flange in the axial direction, with respect to a plurality of notches formed in at least either end of the ring gear in the axial direction. The notches are formed along the inner periphery of the ring gear. Each notch has a bottom part slanted at a predetermined angle with respect to the radial direction of the ring gear, and a plurality of protrusions which correspond to the notches and are projected from the slant portion, in order to press the caulking portion in the axial direction of the ring gear.

2 Claims, 17 Drawing Sheets

(56) References Cited

U.S. PATENT DOCUMENTS

| | | |
|---|---|---|
| 6,656,079 B2 | 12/2003 | Eulenstein et al. |
| 8,015,899 B2 | 9/2011 | Gianone et al. |
| 2001/0026727 A1 | 10/2001 | Okabe et al. |
| 2005/0255960 A1* | 11/2005 | Maruyama et al. ........... 475/331 |
| 2009/0045670 A1 | 2/2009 | Enomoto et al. |
| 2012/0311845 A1* | 12/2012 | Taniguchi et al. ........... 29/522.1 |
| 2013/0035196 A1 | 2/2013 | Taniguchi et al. |
| 2013/0074648 A1* | 3/2013 | Taniguchi et al. .......... 74/606 R |
| 2013/0074649 A1* | 3/2013 | Taniguchi et al. .......... 74/606 R |
| 2013/0112026 A1 | 5/2013 | Ukai et al. |
| 2013/0269462 A1* | 10/2013 | Taniguchi et al. .............. 74/434 |

FOREIGN PATENT DOCUMENTS

| | | |
|---|---|---|
| JP | 55-075515 U | 5/1980 |
| JP | 56-102326 A | 8/1981 |
| JP | 02-031630 U | 2/1990 |
| JP | 02-075424 A | 3/1990 |
| JP | 03-052741 A | 3/1991 |
| JP | 05-001699 A | 1/1993 |
| JP | 05-076961 A | 3/1993 |
| JP | 06-014058 B2 | 2/1994 |
| JP | 08-135804 A | 5/1996 |
| JP | H08135804 A * | 5/1996 |
| JP | 08-226426 A | 9/1996 |
| JP | 09-239480 A | 9/1997 |
| JP | 2819930 B2 | 11/1998 |
| JP | 2000-274494 A | 10/2000 |
| JP | 2001-276939 A | 10/2001 |
| JP | 2003-294114 A | 10/2003 |
| JP | 2005-106183 A | 4/2005 |
| JP | 2007-221899 A | 8/2007 |
| JP | 2008-185139 A | 8/2008 |
| JP | 2010-031913 A | 2/2010 |
| JP | 2010-071372 A | 4/2010 |
| WO | 2011/145189 A1 | 11/2011 |

OTHER PUBLICATIONS www.merriam-webster.com/dictionary/step Oct. 15, 2014.
Office Action of Jul. 10, 2014, in U.S. Appl. No. 13/701,691.
Election/Restriction Requirement of Nov. 21, 2013, in U.S. Appl. No. 13/519,198.
Office Action of Apr. 10, 2014, in U.S. Appl. No. 13/519,198.
Notice of Allowance of Aug. 4, 2014, with Corrected Notice of Allowability of Sep. 19, 2014, in U.S. Appl. No. 13/519,198.
Notice of Allowance issued in U.S. Appl. No. 13/701,691 on Feb. 9, 2015.

\* cited by examiner

METHOD FOR CAULKING RING GEAR, CAULKING TOOL USED FOR METHOD FOR CAULKING RING GEAR, AND RING GEAR

CROSS-REFERENCE TO RELATED APPLICATIONS

This is a 371 national phase application of PCT/JP2010/061528 filed on 7 Jul. 2010, the entire contents of which are incorporated herein by reference.

FIELD OF THE INVENTION

The present invention is related to a differential sub-assembly to be mounted on a vehicle and, more particularly, to a method for caulking or fixing a ring gear to a flange, the ring gear being press-fitted to an outer periphery of a differential case constituting the differential sub-assembly, a caulking tool used for the method, and a ring gear.

BACKGROUND OF THE INVENTION

Heretofore, as one example of techniques in this field, for example, Patent Document 1 listed below discloses a technique that a ring gear is press-fitted to a flange of a differential case, and after that, inner peripheral edges at both ends of the ring gear are fixed by caulking by caulking portions formed on both ends of the flange. Then, predetermined components as well as the ring gear are assembled to the case, and thereby a differential sub-assembly used for a power transmission mechanism of a vehicle is obtained.

FIG. 29 shows a partial perspective view of a ring gear 81 in a prior art. On inner peripheral edges at both ends of the ring gear 81, a plurality of notches 82 are formed as caulked portions to be caulked by a caulking portion of a flange. Heretofore, caulking of the ring gear 81 is performed in such a way that the caulking portion plastically flows in the notches 82. These notches 82 are formed inside the ring gear 81, and the ring gear 81 is caulked by press-widening the flange from inside to outside. Patent Documents 2 to 6 listed below are related to a technique of caulking metal components.

RELATED ART DOCUMENTS

Patent Documents

Patent Document 1: EP0647789B1
Patent Document 2: JP2003-294114A
Patent Document 3: JP56 (1981)-102326A
Patent Document 4: JP02 (1990)-075424A
Patent Document 5: JP2001-276939A
Patent Document 6: JP05 (1993)-076961A
Patent Document 7: JP09 (1997)-239480A

SUMMARY OF INVENTION

Problems to be Solved by the Invention

According to a fastening structure in Patent Document 1, a flange of a differential case needs to be strongly press-widened from inside to outside for increasing a fastening strength of the ring gear fastened to the differential case. However, when the flange is strongly press-widened as described, an excessive forming load is applied to the caulking portion, and thereby there is a possibility that a forming performance of the caulking portion is worsened. Further, in FIG. 29, the ring gear 81 may suffer from deformation and distortion due to the forming load acting on the ring gear 81. In particular, when teeth 83 on an outer periphery of the ring gear 81 are distorted, a gear contact pattern of the ring gear 81 with respect to a counterpart gear is worsened, which could result in worsened noise and oscillation properties of the ring gear.

The present invention has been made to solve the above problems and has a purpose to provide a method for fastening a ring gear by caulking, whereby reducing deformation and distortion of the ring gear when the ring gear is fastened to a differential case by caulking, a caulking tool used for this method, and a ring gear.

Means of Solving the Problems (1) One aspect of the present invention to achieve the above-mentioned purpose is to provide a caulking tool for use in caulking a caulking portion formed on at least one of both ends of a flange in an axial direction thereof to a caulked portion formed on at least one of both ends of a ring gear in an axial direction thereof, the ring gear being press-fitted on an outer periphery of the flange of a differential case constituting a differential sub-assembly, wherein the caulked portion is a plurality of notches formed along an inner peripheral edge of the ring gear, each notch including a bottom part slanted at a predetermined angle with respect to a radial direction of the ring gear, and the caulking tool includes: a slant portion slanted at a predetermined angle with respect to the radial direction of the ring gear to press the caulking portion in the axial direction of the ring gear; and a plurality of protrusions protruding from the slant portion, the protrusions being arranged corresponding to the plurality of notches, and each of the protrusions has a shape conforming to a shape of each of the notches and a size smaller than that of each notch.

According to the configuration in (1), when the caulking tool presses the caulking portion and each notch is closed at a bottom dead center of the caulking portion, each of the protrusions protruding from the slant portion is in point contact with the caulking portion, thus reducing friction between the caulking portion and the protrusions, and thereby a material forming the caulking portion flows around the contact portion. The material of the caulking portion also flows in the vicinity of the bottom part of each notch.

(2) A second aspect of the present invention to achieve the above-mentioned purpose is to provide a caulking tool for use in caulking a caulking portion formed on at least one of both ends of a flange in an axial direction thereof to a caulked portion formed on at least one of both ends of a ring gear in an axial direction thereof, the ring gear being press-fitted on an outer periphery of the flange of a differential case constituting a differential sub-assembly, wherein the caulked portion is a plurality of notches formed along an inner peripheral edge of the ring gear, and the caulking tool includes: a flat portion extending in a direction intersecting the axial direction of the ring gear to press the caulking portion in the axial direction of the ring gear; a slant portion slanted to a central direction of the ring gear from the flat portion to press the caulking portion; and a holding portion protruding from the flat portion toward the ring gear on an opposite side from the slant portion with respect to the flat portion for holding the caulking portion.

According to the configuration in (2), the pressing force is hardly applied to the bottom part of each notch when the caulking portion is pressed by the caulking tool.

(3) A third aspect of the present invention to achieve the above-mentioned purpose is to provide a method for caulking a ring gear press-fitted on an outer periphery of a flange of a differential case constituting a differential sub-assembly, the ring gear being fastened by use of a caulking tool to caulk a caulking portion formed on at least one of both ends of the flange in an axial direction thereof to a caulked portion formed on at least one of both ends of the ring gear in an axial direction thereof, wherein the caulked portion is a plurality of notches formed along an inner peripheral edge of the ring gear, and the caulking method includes: a pressing step of pressing the caulking portion in the axial direction of the ring gear by use of a first caulking tool so that the caulking portion is deformed toward the ring gear; and a diverting step of, after the pressing step, further pressing the caulking portion by use of a second caulking tool according to a diverting method so that a material forming the caulking portion is filled in the notches.

According to the configuration in (3), when the caulking portion is pressed by the second caulking tool in the diverting step, a part of the material forming the caulking portion is diverted in flow, and thereby the pressing force is reduced.

(4) A fourth aspect of the present invention to achieve the above-mentioned purpose is to provide method for caulking a ring gear press-fitted on an outer periphery of a flange of a differential case constituting a differential sub-assembly, the ring gear being fastened by use of a caulking tool to caulk a caulking portion formed on at least one of both ends of the flange in an axial direction thereof to a caulked portion formed on at least one of both ends of the ring gear in an axial direction thereof, wherein the caulked portion is a plurality of notches formed along an inner peripheral edge of the ring gear, and the caulking method includes: a first pressing step of pressing the caulking portion by use of the caulking tool so that the caulking portion is deformed toward the ring gear; and a second pressing step of, after the first pressing step, further pressing the caulking portion by use of the caulking tool in the axial direction of the ring gear so that a material forming the caulking portion is filled in the notches.

According to the configuration in (4), when the caulking portion is pressed by the second caulking tool in the second pressing step, the pressing force can be hardly applied to the bottom part of each notch.

(5) A fifth aspect of the present invention to achieve the above-mentioned purpose is to provide a ring gear to be press-fitted to an outer periphery of a flange of a differential case constituting a differential sub-assembly, the ring gear being formed with a caulked portion on at least one of both ends in an axial direction, the caulked portion being to be caulked by a caulking portion formed on at least one of both ends in an axial direction of the flange, wherein the caulked portion is a plurality of notches formed along an inner peripheral edge of the ring gear, each notch being of a recess-like shape extending at a uniform depth and a uniform width on an inner peripheral surface of the ring gear, and the plurality of notches are formed in parallel to each other and slanted toward a circumferential direction at a predetermined angle with respect to the axial direction on the inner peripheral surface of the ring gear.

According to the configuration in (5), since a clearance surface of the notch is reduced, a load applied to the clearance surface from the differential case becomes small when the ring gear is caulked by the caulking portion. In addition to this effect, the plurality of notches are formed obliquely with respect to the axial direction at a predetermined angle, so that mechanical resistance in the axial direction by the notches are increased when the ring gear is press-fitted and caulked to the flange of the differential case.

Effects of the Invention

According to the configurations in (1) to (5), deformation and distortion of a ring gear can be decreased when the ring gear is fastened to a differential case by caulking. Thereby, a ring gear can maintain a suitable gear contact pattern with respect to a counterpart gear, and thus exhibit improved noise and oscillation properties.

DETAILED DESCRIPTION

First Embodiment

A first embodiment illustrating a method for caulking a ring gear according to the present invention is described in detail with reference to the accompanying drawings.

Figure 1:
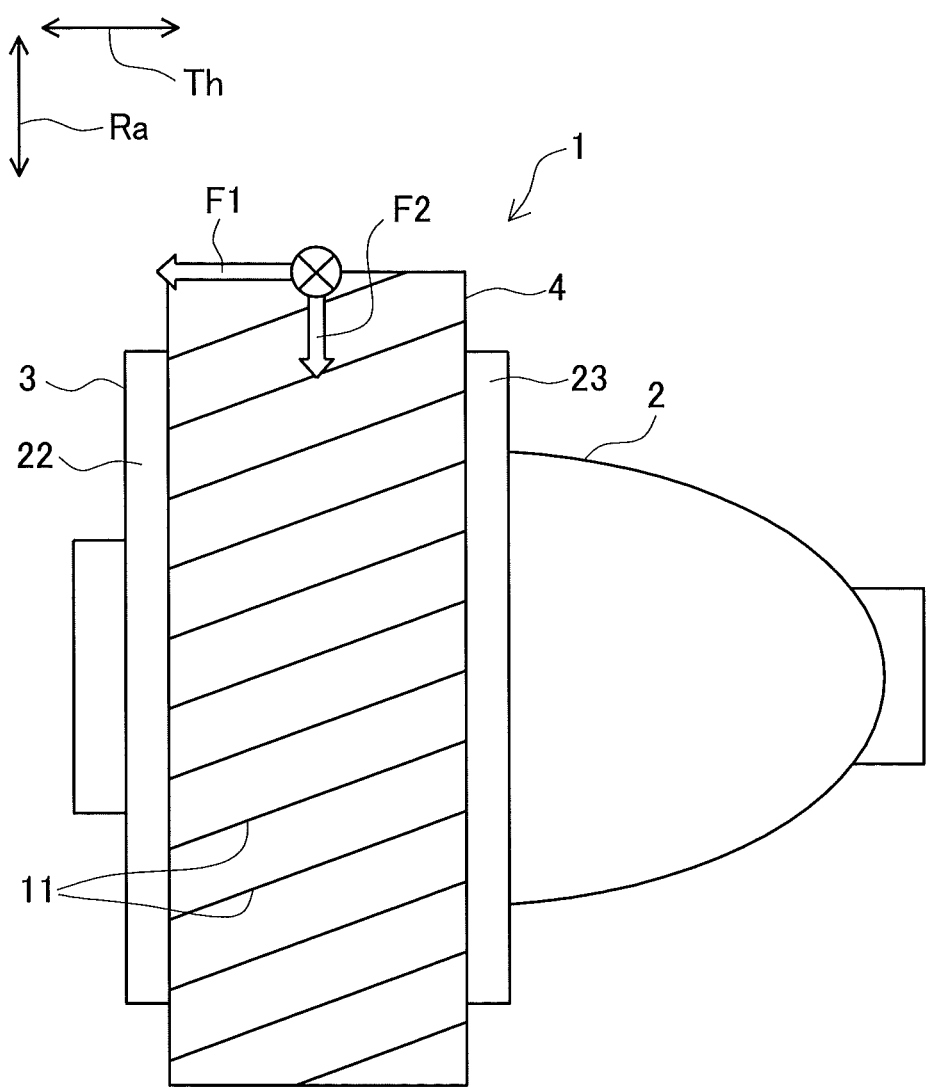
FIG. 1 is a side view showing a schematic configuration of a differential sub-assembly according to a first embodiment.
Figure 2:
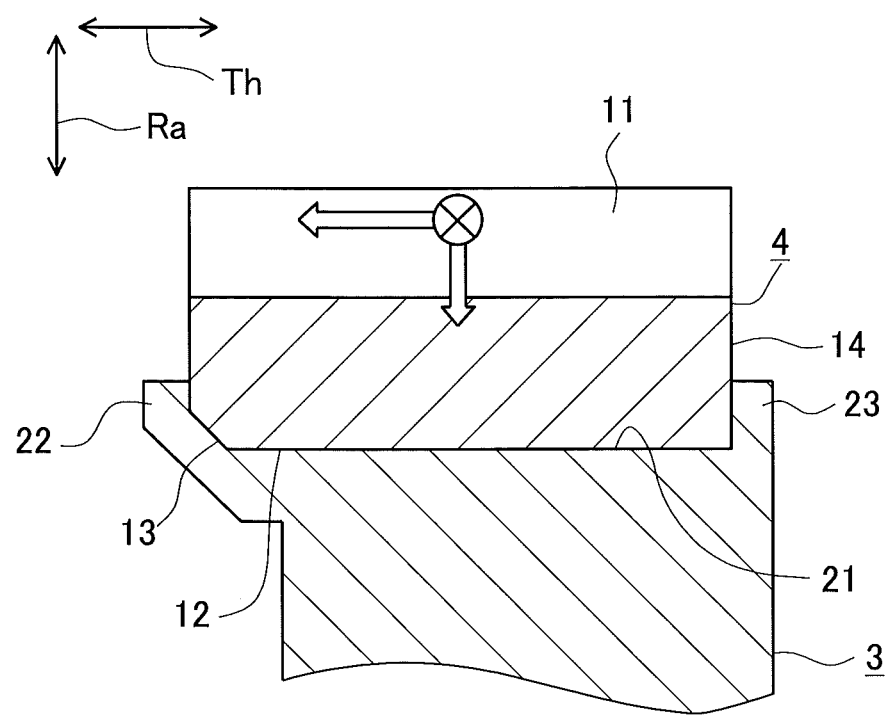
FIG. 2 is a sectional view showing a schematic relationship between a flange of a differential case and a ring gear according to the first embodiment.

FIG. 1 is a side view showing a schematic configuration of a differential sub-assembly 1. FIG. 2 is a schematic sectional view showing a relationship between a flange 3 of a differential case 2 and a ring gear 4. As shown in FIG. 1, the differential sub-assembly 1 includes the differential case 2, the flange 3 provided on one end (left side in the figure) of an outer periphery of the differential case 2, and the ring gear 4 of an annular shape fastened to an outer periphery of the flange 3. In the case 2, a pair of side gears and a pair of pinions (both are not shown in the figure) are stored and held in a rotatable manner.

In FIGS. 1 and 2, an arrow Th indicates an axial direction of the flange 3 and the ring gear 4, and an arrow Ra indicates a radial direction of the flange 3 and the ring gear 4 (the arrows Th and Ra similarly indicate the axial and radial directions in the other figures).

This differential sub-assembly 1 is used for a power transmission mechanism of a vehicle. For example, the differential sub-assembly 1 is provided to a transmission, a transfer, a final reduction gear, and others of a vehicle. The differential sub-assembly 1 is arranged to transmit power, which is inputted from a counterpart gear (not shown) to the ring gear 4, to a rotation member connected to the pair of pinions as allowing the rotational difference of the pair of side gears. Herein, the rotation member may be such as a left-and-right pair of driving wheels and a front-and-rear pair of driving axles of a vehicle.

Figure 29:
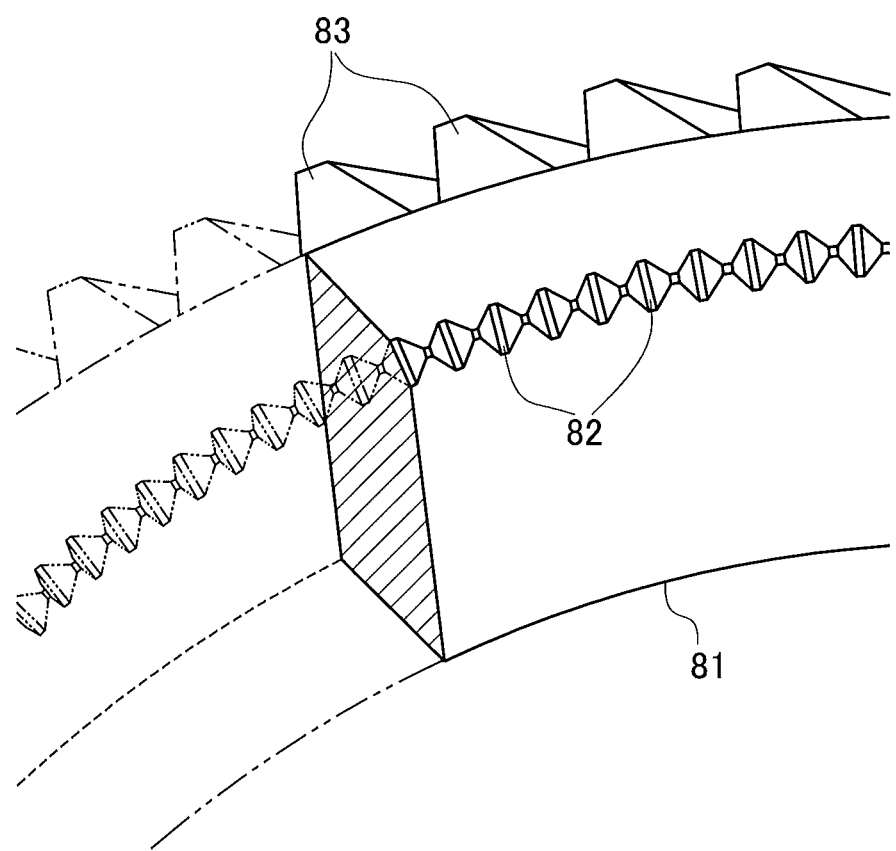
FIG. 29 is a partial perspective view of a ring gear in a prior art.

As shown in FIGS. 1 and 2, in the present embodiment, the ring gear 4 is formed of a helical gear in which a plurality of teeth 11 are formed on an outer periphery to be oblique with respect to an axial direction of the ring gear 4. The ring gear 4 is press-fitted on a press-fitting surface 12 as an inner circumferential (peripheral) surface to an outer circumferential (peripheral) surface 21 of the flange 3 and the ring gear 4 is caulked to the flange 3. Specifically, a caulking portion 22 is formed on one end (left side in FIG. 2) in an axial direction of the flange 3, and a bank 23 perpendicularly extending from the press-fitting surface 21 is formed on the other end (right side in FIG. 2). The ring gear 4 includes a plurality of notches 13 formed obliquely in the inner peripheral edge at one end of the ring gear 4 in an axial direction thereof. The notches 13 serve as caulked portions to be caulked or crimped by the caulking portion 22. The configuration of these notches 13 are basically similar to those of the notches 82 of the ring gear 81 in the conventional art shown in FIG. 29. The notches 13 are formed along the inner peripheral edge at one end of the ring gear 4 and spaced uniformly from each other. Size of each notch is determined according to a required strength for caulking (the same is the case with the following embodiments). To the notches 13, caulking is performed by plastically working the caulking portion 22. The notches 13 are formed inside the ring gear 4, and caulking is conducted such that the flange 3 is press-widened from inside to outside.

Figure 3:
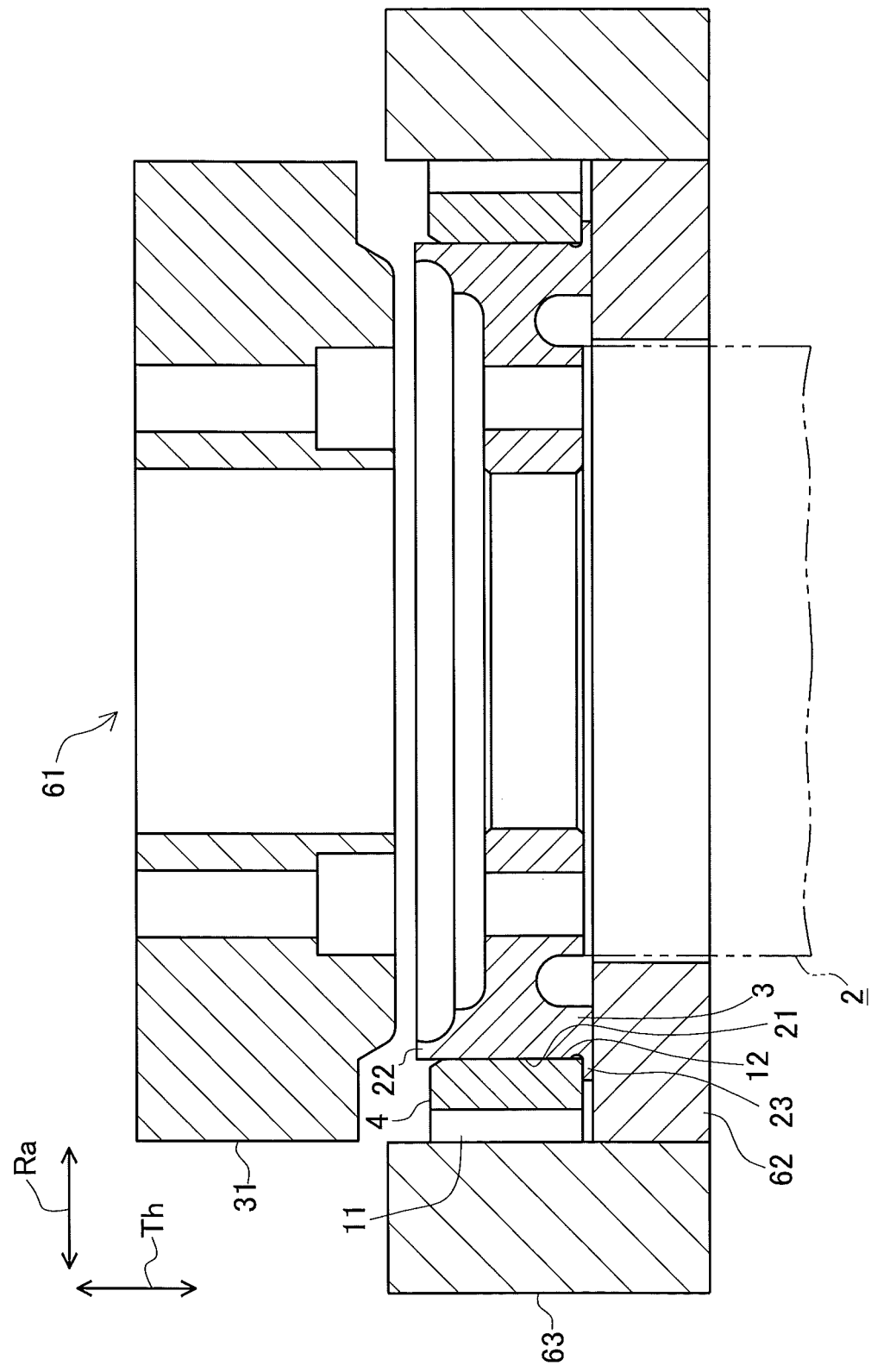
FIG. 3 is a partial sectional view of a caulking device used for caulking in the first embodiment.

Then, the notches 13 are caulked by the caulking portion 22 in a state that one end surface 14 of the ring gear 4 is in contact with the bank 23. FIG. 3 shows a partial sectional view of a caulking device 61 used for caulking. The caulking device 61 includes a base tool 62 of an annular shape to support the differential case 2, an outer circumferential tool 63 of a cylindrical shape, which is arranged to surround an outer periphery of the base tool 62, and a caulking tool 31 of an annular shape, which is formed to be reciprocally movable with respect to the base tool 62. In the base tool 62, the case 2 in which the ring gear 4 is press-fitted to the flange 3 is held with the flange 3. In this holding state, the outer periphery of the ring gear 4 is held by the outer circumferential tool 63. The caulking tool 31 is driven by an actuator (not shown). The caulking tool 31 is moved downward toward the case 2 and the caulking portion 22 is pressed by the caulking tool 31 so that the ring gear 4 is caulked to the case 2 by the caulking portion 22. The caulking tool 31 has a lower surface whose outer peripheral portion configured to press the caulking portion 22. In this manner, the ring gear 4 is fastened to the flange 3 of the case 2 by caulking.

Figure 4:
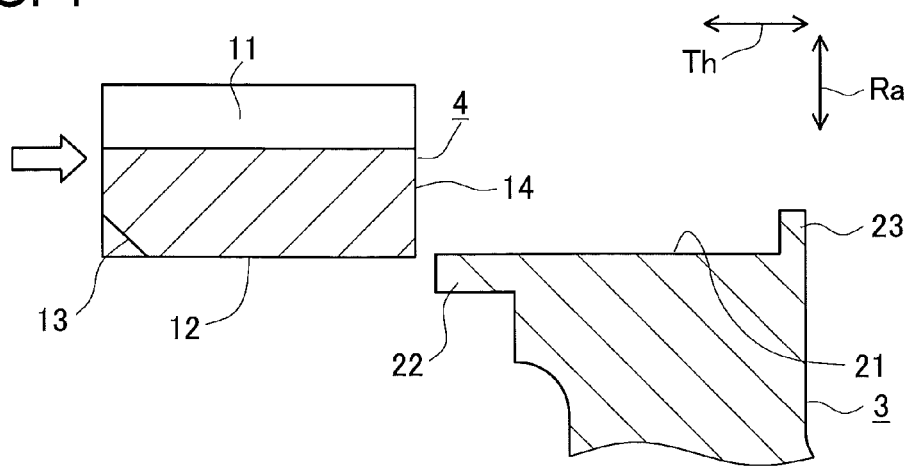
FIG. 4 is a schematic sectional view showing a "pressing step" of a fastening method in the first embodiment.
Figure 5:
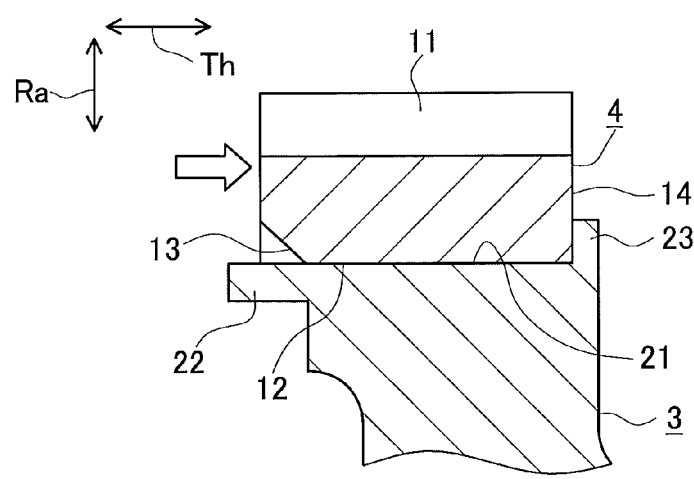
FIG. 5 is a schematic sectional view showing the "pressing step" of the fastening method in the first embodiment.
Figure 6:
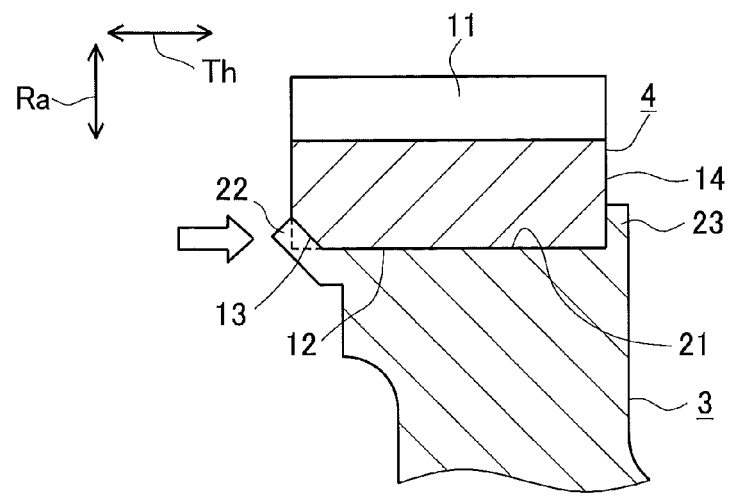
FIG. 6 is a schematic sectional view showing a "caulking step" of the fastening method in the first embodiment.

Next, a ring gear fastening method according to the present embodiment will be described. FIGS. 4 to 6 are schematic sectional views corresponding to FIG. 2, showing each step of the fastening method.

First, in a "press-fitting step" as shown in FIGS. 4 and 5, the ring gear 4 is press-fitted on its press-fitting surface 12 to the outer circumferential surface 21 of the flange 3. At this time, the caulking portion 22 of the flange 3 remains extending in parallel with the outer circumferential surface 21. Further, as shown in FIG. 5, the ring gear 4 is pressed in the axial direction of the ring gear 4 until the one end surface 14 comes into contact with the bank 23 so as to be press-fitted. In this press-fitting state, the press-fitting surface 12 of the ring gear 4 is in close contact with the outer circumferential surface 21 of the flange 3.

After that, in a "caulking step" in FIG. 6, the caulking portion 22 of the flange 3 is pressed against the notches 13 of the ring gear 4 for caulking by use of the caulking device 61 shown in FIG. 3. In this caulking state, the ring gear 4 is positioned in place in the axial direction with respect to the flange 3 and fixed therein.

A method for caulking the ring gear in the "caulking step" will be explained in more detail. In the caulking method of the present embodiment, the ring gear 4 press-fitted to the outer circumferential surface 21 of the flange 3 of the differential case 2 is fastened by caulking in a manner that the caulking portion 22 provided on one axial end of the flange 3 is caulked to the plurality of notches 13 formed on one axial end of the ring gear 4 by use of the caulking tool 31.

Figure 7:
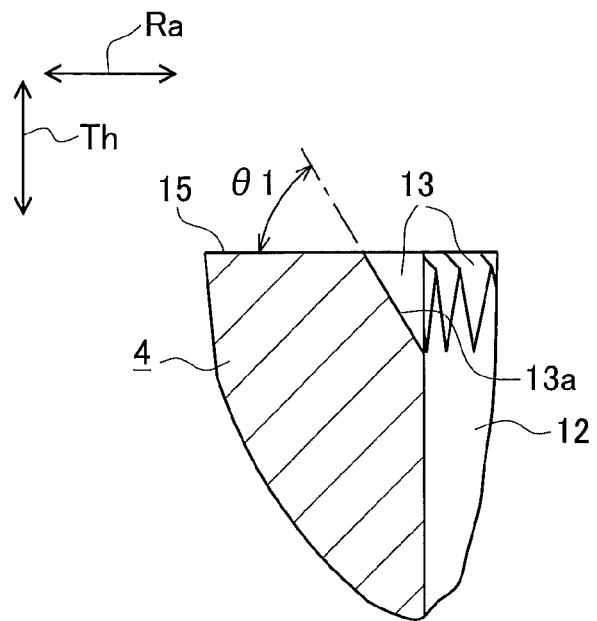
FIG. 7 is a partial sectional view of the ring gear in the first embodiment.
Figure 8:
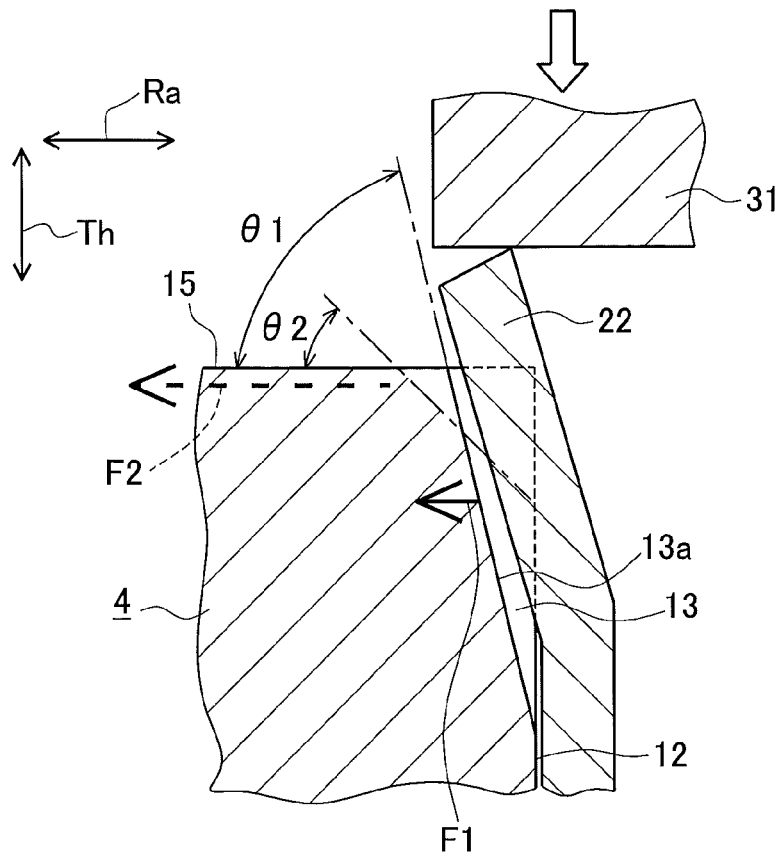
FIG. 8 is a sectional view showing a relationship among notches, a caulking portion, and a caulking tool in the "caulking step" of the first embodiment.

FIG. 7 is a partial sectional view of the ring gear 4. FIG. 8 is a sectional view showing a relationship among the notches 13, the caulking portion 22, and the caulking tool 31 in the "caulking step." As shown in FIG. 7, the plurality of notches 13 formed in the ring gear 4 are slanted at a predetermined angle θ1 with respect to a radial direction of the ring gear 4. In other words, each notch 13 has a bottom part 13a slanted at a predetermined angle θ1 with respect to an end surface 15 (an end face opposite to the one end surface 14) of the ring gear 4. In the present embodiment, the predetermined angle θ1 is set to be in a range of 45° to 85° or more preferably in a range of 50° to 70°. As shown in FIG. 8, the predetermined angle θ1 of the bottom part 13a in the present embodiment is larger than a predetermined angle θ2 (about) 45° of a bottom part of each conventional notch 82.

Further, in the "caulking step," as shown in FIG. 8, the caulking portion 22 of the flange 3 is pressed in the axial direction of the ring gear 4 by the caulking tool 31 so that a material forming the caulking portion 22 is filled in the notches 13.

According to the caulking method of the present embodiment, the bottom part 13a of each notch 13 is slanted with respect to the radial direction of the ring gear 4 at the predetermined angle θ1 which is larger than the angle in the conventional arts. Thereby, when the caulking portion 22 is pressed in the axial direction of the ring gear 4 by the caulking tool 31, a component F1 (indicated with a thick line with an arrow in the figure) of a pressing force applied to the bottom part 13a of each notch 13 in the radial direction of the ring gear 4 is smaller than a component F2 (indicated with a dashed thick line with an arrow in the figure) of a force applied to the conventional notch. To be specific, when caulking, a load acting on the ring gear 4 in the radial direction thereof is extremely small compared to a load acting on the ring gear 4 in the axial direction thereof. As a result, deformation and distortion of the teeth 11 of the ring gear 4 can be decreased when the ring gear 4 is caulked to the flange 3 of the differential case 2. Thereby, the ring gear 4 can maintain a suitable gear contact pattern with respect to the counterpart gear and thus exhibit improved noise and oscillation properties.

Second Embodiment

A second embodiment illustrating a method for caulking a ring gear according to the present invention is described in detail with reference to the accompanying drawings.

In the following explanation, same or similar elements as the first embodiment will be given the same reference numerals and not described again, and different point will be mainly explained.

Figure 9:
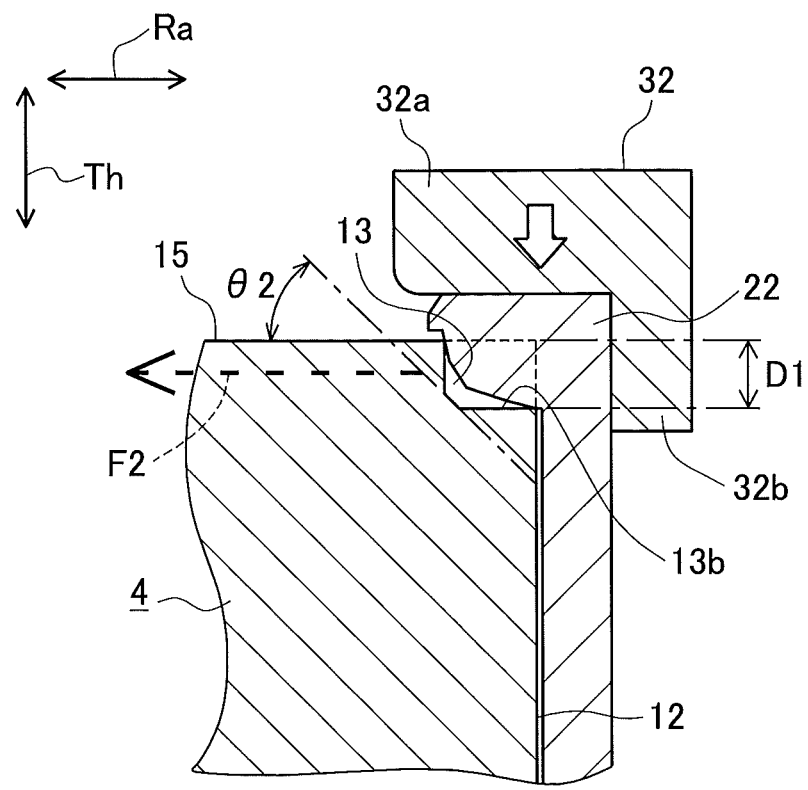
FIG. 9 is a sectional view showing a relationship among notches of a ring gear, a caulking portion, and a caulking tool in a "caulking step" of a second embodiment.

The present embodiment is different from the first embodiment regarding the configuration of notches 13 formed in a ring gear 4. FIG. 9 is a sectional view showing a relationship among the notches 13 of the ring gear 4, a caulking portion 22, and a caulking tool 32 in a "caulking step." As shown in FIG. 9, each notch 13 in the present embodiment has a bottom part 13b extending along a direction intersecting an axial direction of the ring gear 4 (a radial direction of the ring gear 4), i.e., along an end surface 15 in the axial direction of the ring gear 4 and having a uniform depth D1 from the end surface 15.

In a "caulking step," the caulking portion 22 is pressed in the axial direction of the ring gear 4 by use of the caulking tool 32 so that a material forming the caulking portion 22 is filled in the notches 13 as shown in FIG. 9.

Herein, as shown in FIG. 9, the caulking tool 32 has a pressing part 32a for pressing the caulking portion 22 in the axial direction of the ring gear 4 and a holding part 32b for holding a part of the caulking portion 22 formed opposite from a part to be engaged with the notches 13. A part of the caulking tool 32 is shown in FIG. 9.

According to the caulking method of the present embodiment, the bottom part 13b of each notch 13 of the ring gear 4 extends at a uniform depth D1 in a direction intersecting the axial direction of the ring gear 4 (the radial direction of the ring gear 4). Thereby, when the caulking portion 22 is pressed in the axial direction of the ring gear 4 by the caulking tool 32, a large part of a pressing force vertically acts on the bottom part 13b, so that a component of the pressing force hardly acts on the ring gear 4 in the radial direction thereof unlike the component F2 (indicated with a thick dashed line with an arrow in the figure) acting on the bottom part of the conventional notch. In other words, when caulking, the ring gear 4 is hardly subjected to a load in the radial direction thereof, and a large part of the load is applied to the ring gear 4 in the axial direction thereof. As a result, deformation and distortion of teeth 11 of the ring gear 4 can be reduced when the ring gear 4 is fastened to a flange 3 of a differential case 2 by caulking. Thereby, the ring gear 4 can maintain a suitable gear contact pattern with respect to a counterpart gear, and thus exhibit improved noise and oscillation properties.

Figure 10:
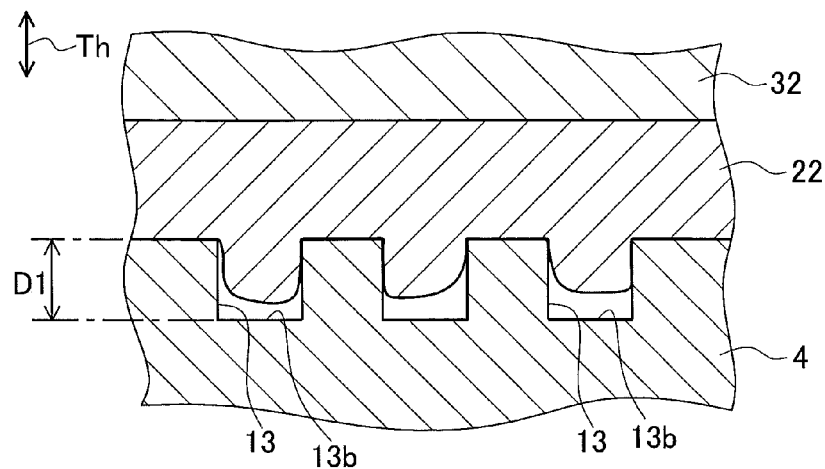
FIG. 10 is a sectional view showing a relationship among a sectional shape of the notches, the caulking portion, and the caulking tool in the "caulking step" of the second embodiment.
Figure 11:
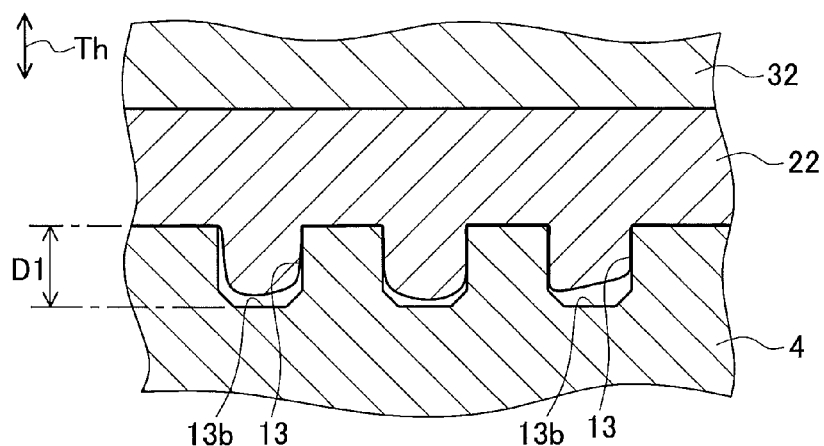
FIG. 11 is a sectional view showing a relationship among the sectional shape of the notches, the caulking portion, and the caulking tool in the "caulking step" of the second embodiment.
Figure 12:
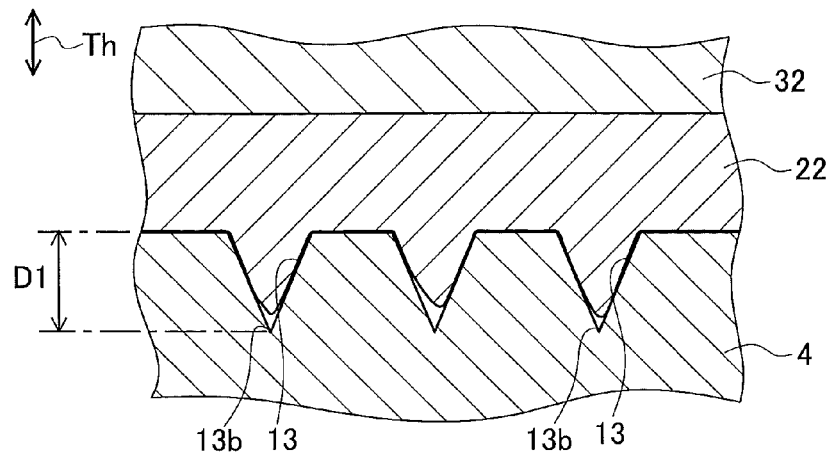
FIG. 12 is a sectional view showing a relationship among the sectional shape of the notches, the caulking portion, and the caulking tool in the "caulking step" of the second embodiment.

Examples of a sectional shape of the notches 13 are now illustrated. FIGS. 10 to 12 show a relationship among a sectional shape of the notches 13, the caulking portion 22, and the caulking tool 32 in the "caulking step," respectively. FIG. 10 shows the notches 13 each having a rectangular sectional shape, FIG. 11 shows the notches 13 each having an almost U-shaped sectional shape, and FIG. 12 shows the notches 13 each having a V-shaped sectional shape. As shown in FIGS. 10 to 12 respectively, the caulking portion 22 is pressed by the caulking tool 32, and thereby a part of the material forming the caulking portion 22 is filled in the notches 13 like a wedge in conformity with the sectional shape of each notch 13.

Third Embodiment

A third embodiment illustrating a method for caulking a ring gear according to the present invention is described in detail with reference to the accompanying drawings.

Figure 13:
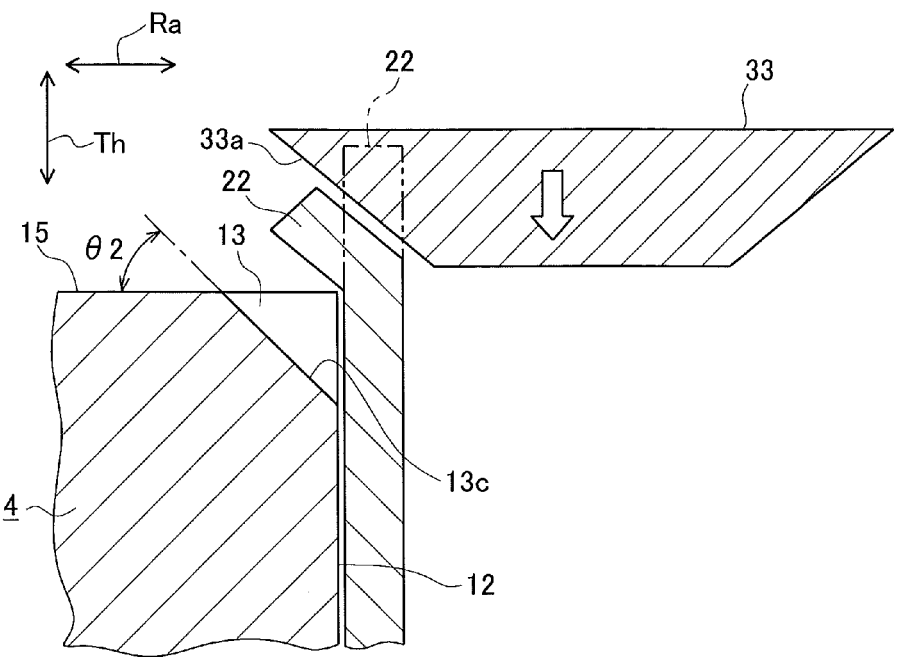
FIG. 13 is a sectional view showing a relationship among a notch of a ring gear, a caulking portion, and a caulking tool in a "first pressing step" of a third embodiment.

In the present embodiment, while a configuration of notches 13 formed in a ring gear 4 is similar to that of the conventional art, a caulking method using a caulking tool is different from the configurations in the above-mentioned embodiments. FIG. 13 is a sectional view showing a relationship among the notches 13 of the ring gear 4, a caulking portion 22, and a caulking tool 33 in a "first pressing step" configuring a "caulking step." FIG. 14 is a sectional view showing a relationship among the notches 13 of the ring gear 4, the caulking portion 22, and a caulking tool 34 in a "second pressing step" configuring the "caulking step." As shown in FIGS. 13 and 14, each notch 13 in the present embodiment is similar to the conventional notch and has a bottom part 13c slanted at a predetermined angle θ2.

As shown in FIG. 13, in the "first pressing step," the caulking portion 22 is pressed in an axial direction of the ring gear 4 by use of the first caulking tool 33 so that an end portion of the caulking portion 22 is deformed toward each notch 13 of the ring gear 4. In this deformed state, the end portion of the caulking portion 22 is separated from each notch 13.

Herein, the first caulking tool 33 has a taper surface 33a to be in contact with the end portion of the caulking portion 22 as shown in FIG. 13. The end portion of the caulking portion 22 is pressed by this taper surface 33a, and thereby the end portion of the caulking portion 22 is deformed toward each notch 13 of the ring gear 4. A part of the first caulking tool 33 is shown in FIG. 13.

Figure 14:
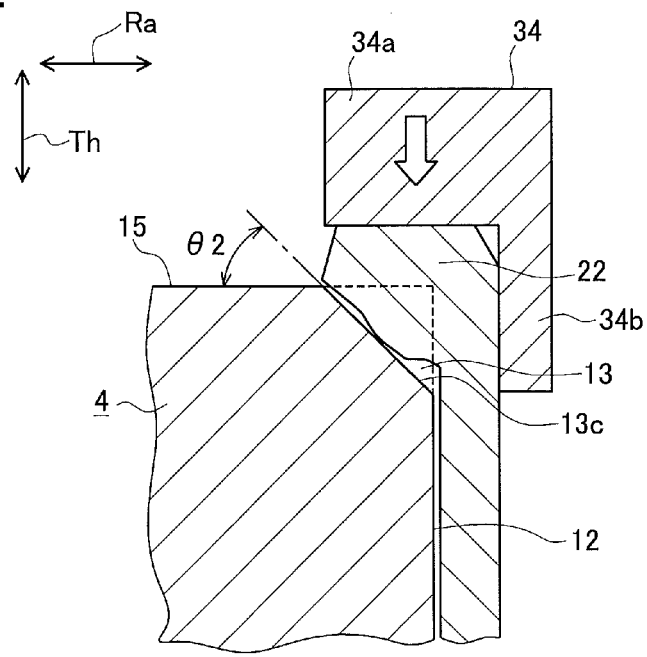
FIG. 14 is a sectional view showing a relationship among the notch of the ring gear, the caulking portion, and the caulking tool in a "second pressing step" of the third embodiment.

After that, as shown in FIG. 14, in the "second pressing step," the caulking portion 22 is further pressed in the axial direction of the ring gear 4 by the second caulking tool 34 so that a material forming the caulking portion 22 is filled in the notches 13.

As similar to the caulking tool 32 used in the second embodiment, the second caulking tool 34 has a pressing part 34a for pressing the caulking portion 22 in the axial direction of the ring gear 4 and a holding part 34b for holding a part of the caulking portion 22 formed opposite to a part to be engaged with the notches 13 as shown in FIG. 14. A part of the second caulking tool 34 is shown in FIG. 14.

According to the caulking method of the present embodiment, the end portion of the caulking portion 22 is pressed by the taper surface 33a of the first caulking tool 33 in the "first pressing step" so that the end portion of the caulking portion 22 is temporarily deformed toward each notch 13 of the ring gear 4. After that, in the "second pressing step," the deformed caulking portion 22 is pressed in the axial direction of the ring gear 4 by the second caulking tool 34 so that the material of the caulking portion 22 is filled in the notches 13. When the caulking portion 22 is pressed by the second caulking tool 34 in the "second pressing step," the pressing force can be rarely applied to the bottom part 13c of each notch 13. Thereby, when caulking, the load acting on the ring gear 4 in the radial direction thereof becomes extremely small. As a result, deformation and distortion of teeth 11 of the ring gear 4 can be reduced when the ring gear 4 is fastened to a flange 3 of a differential case 2 by caulking. Therefore, the ring gear 4 can maintain a suitable gear contact pattern with respect to a counterpart gear, and thus exhibit improved noise and oscillation properties.

Fourth Embodiment

A caulking tool for use in a method of caulking a ring gear according to the present invention is described in detail with reference to the accompanying drawings.

Figure 15:
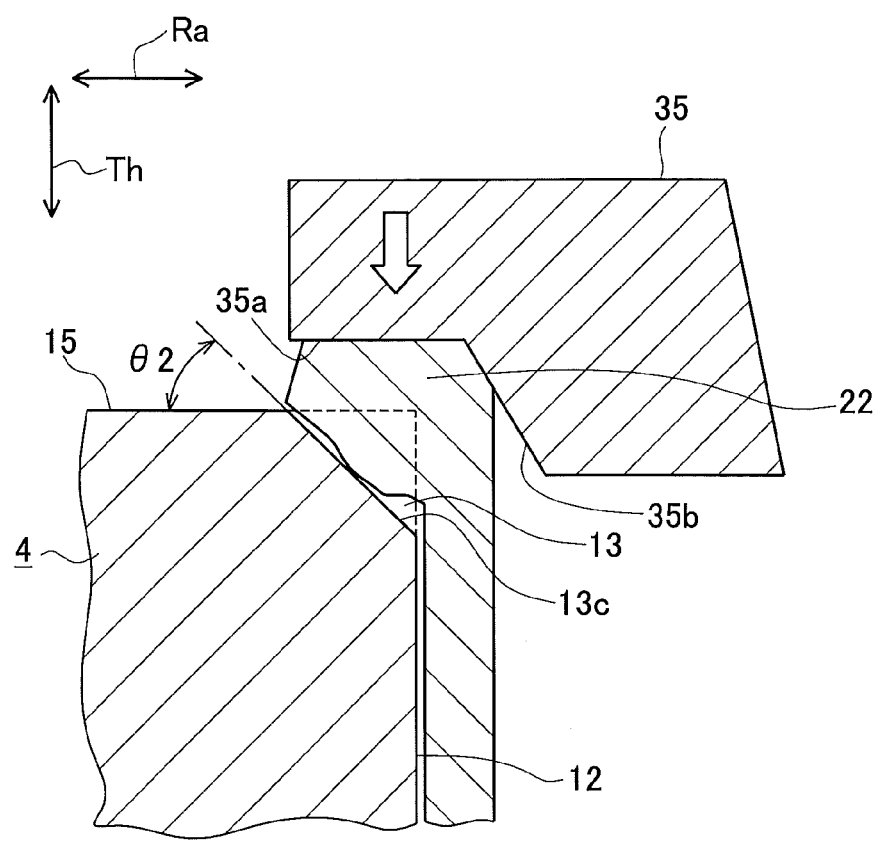
FIG. 15 is a sectional view showing a relationship among a notch of a ring gear, a caulking portion, and a caulking tool in a "caulking step" of a fourth embodiment.

In the present embodiment, it is premised that a configuration of notches 13 formed in a ring gear 4 is similar to that of the conventional art. FIG. 15 is a sectional view showing a relationship among the notches 13 of the ring gear 4, a caulking portion 22, and a caulking tool 35 in a "caulking step." The caulking tool 35 includes a flat portion 35a extending along a direction intersecting an axial direction of the ring gear 4 (a radial direction of the ring gear 4) and a slant portion 35b slanted (tapered) toward a central direction of the ring gear 4 from the flat portion 35a to press the caulking portion 22 in the axial direction of the ring gear 4. A part of the caulking tool 35 is shown in FIG. 15.

According to the caulking tool 35 in the present embodiment, in the "caulking step," the caulking portion 22 is pressed in the axial direction of the ring gear 4 by the caulking tool 35 as shown in FIG. 15 so that the caulking portion 22 is pressed by the flat portion 35a while a part of the caulking portion 22 flows along the slant portion 35b to be away from the notches 13 in an opposite direction. Thereby, a material of the caulking portion 22 is filled in each notch 13. In other words, the caulking portion 22 is subjected to swaging by the flat portion 35a and filled in each notch 13. Therefore, when the caulking portion 22 is pressed in the axial direction of the ring gear 4 by the caulking tool 35, the pressing force is hardly applied to the bottom part 13e of each notch 13. Thereby, when caulking, a load acting on the ring gear 4 in the radial direction thereof is extremely small. As a result, when the ring gear 4 is fastened to a flange 3 of a differential case 2 by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Fifth Embodiment

A fifth embodiment illustrating a caulking tool for use in a method of caulking a ring gear according to the present invention is described in detail with reference to the accompanying drawings.

Figure 16:
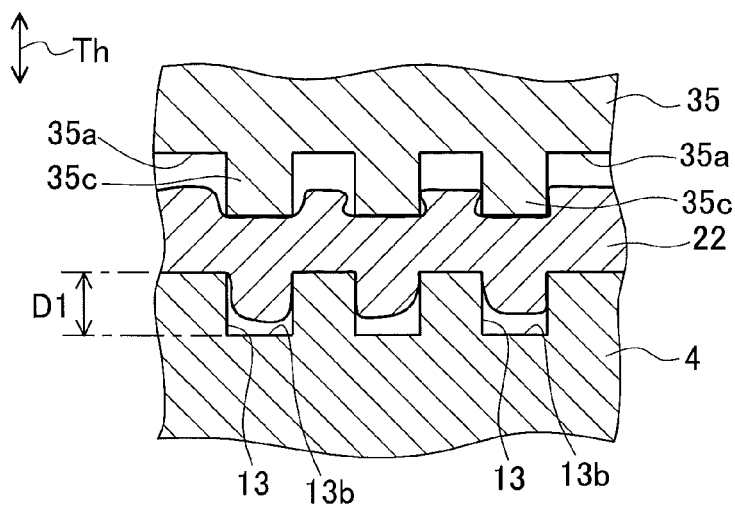
FIG. 16 is a sectional view showing a relationship among a sectional shape of a notch, a caulking portion, and a caulking tool in a "caulking step" of a fifth embodiment.

FIG. 16 is a sectional view corresponding to FIG. 10, showing a relationship among a sectional shape of notches 13, a caulking portion 22, and a caulking tool 35 in a "caulking step." The present embodiment is different from the fourth embodiment regarding the configuration of the notches 13. To be specific, each notch 13 has a bottom part 13b formed along a direction intersecting an axial direction of the ring gear 4 (a radial direction of the ring gear 4) and extending at a uniform depth D1 and has a rectangular sectional shape as shown in FIG. 16. Further, the present embodiment is different from the fourth embodiment regarding the configuration of a flat portion 35a of the caulking tool 35. To be specific, the flat portion 35a is formed with protrusions 35c fittable with the notches 13 as shown in FIG. 16. Each of the protrusions 35c has a rectangular sectional shape conforming to the sectional shape of each notch 13.

According to the caulking tool 35 in the present embodiment, in the "caulking step," the caulking portion 22 is pressed in the axial direction of the ring gear 4 such that a phase of each protrusion 35c conforms to a phase of each notch 13, and thereby the caulking portion 22 is partially pressed by each protrusion 35c as shown in FIG. 16. Thus, a part of a material forming the caulking portion 22 is deformed in conformity with the sectional shape of each protrusion 35c and filled in each notch 13 like a wedge. Particularly, in the present embodiment, since the caulking portion 22 is partially pressed by each protrusion 35c, the pressing force to be given to the caulking tool 35 can be reduced compared to the example illustrated in FIG. 10. Further, when caulking, a load hardly acts on the ring gear 4 in the radial direction thereof, and a large part of the load is applied to the ring gear 4 in the axial direction thereof. As a result, when the ring gear 4 is fastened to a flange 3 of a differential case 2 by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Figure 17:
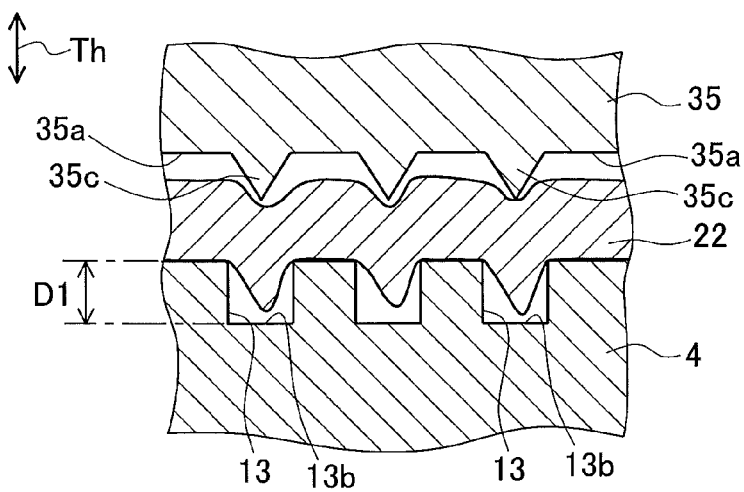
FIG. 17 is a sectional view of a modification showing a relationship among a sectional shape of the notches, the caulking portion, and the caulking tool in the "caulking step" of the fifth embodiment.
Figure 18:
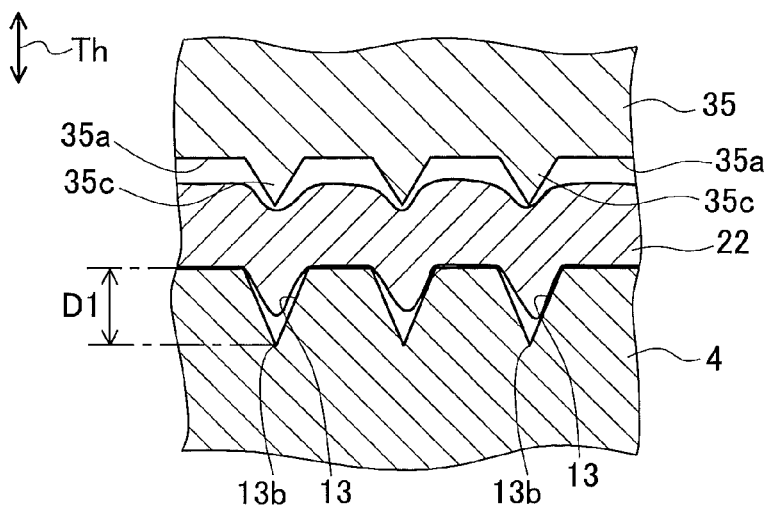
FIG. 18 is a sectional view of a modification showing a relationship among the sectional shape of the notches, the caulking portion, and the caulking tool in the "caulking step" of the fifth embodiment.

Herein, modified examples of sectional shapes of the notches and the protrusions 35c are illustrated. FIGS. 17 and 18 are sectional views corresponding to FIG. 16, showing a relationship among a sectional shape of the notches 13, the caulking portion 22, and the caulking tool 35 in the "caulking step", respectively. FIG. 17 shows the notches 13 each having a rectangular sectional shape and the protrusions 35c each having a V-shaped sectional shape. FIG. 18 shows the notches 13 and the protrusions 35c each of both having the V-shaped sectional shape. As shown in FIGS. 17 and 18, when the caulking portion 22 is pressed by the caulking tool 35, the phase of each protrusion 35c conforms to the phase of each notch 13, and thereby the caulking portion 22 is partially pressed by each protrusion 35c. Therefore, it is confirmed that a part of the material of the caulking portion 22 is deformed in conformity to the sectional shape of each protrusion 35c and filled in each notch 13 like a wedge as similar to the example shown in FIG. 16.

Sixth Embodiment

A sixth embodiment illustrating a caulking tool for use in a method of caulking a ring gear is described in detail with reference to the accompanying drawings.

Figure 19:
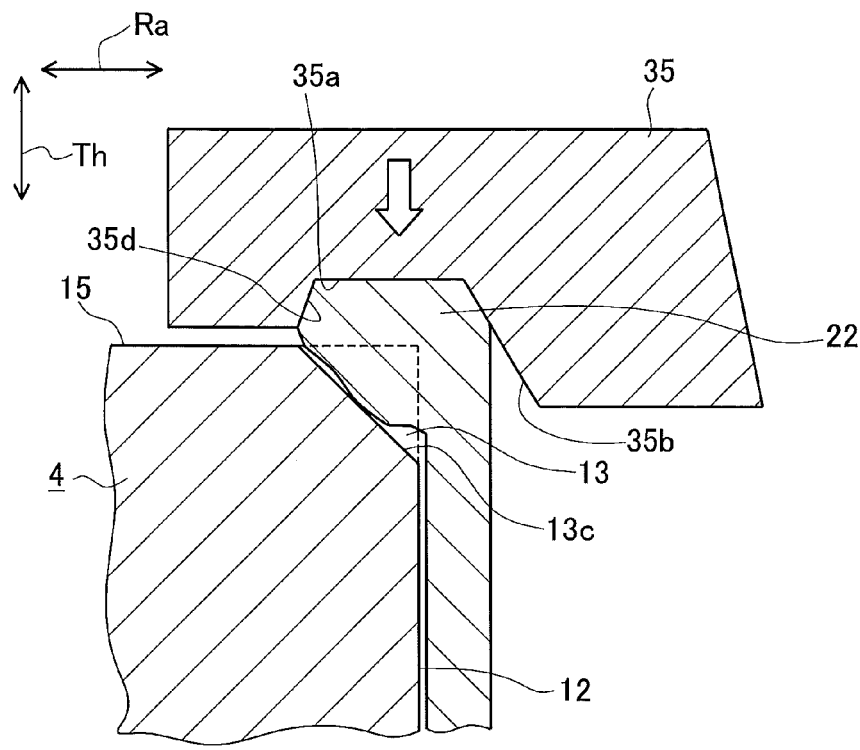
FIG. 19 is a sectional view showing a relationship among a notch of a ring gear, a caulking portion, and a caulking tool in a "caulking step" of a sixth embodiment.

FIG. 19 is a sectional view showing a relationship among notches 13 of a ring gear 4, a caulking portion 22, and a caulking tool 35 in a "caulking step" using the caulking tool 35. The caulking tool 35 in the present embodiment is different from that of the fourth embodiment with the following points. Namely, in addition to the configuration of the caulking tool 35 in the fourth embodiment, the caulking tool 35 of the present embodiment further includes a holding part 35d protruding from a flat portion 35a toward the ring gear 4 on an opposite side from a slant portion 35b with respect to the flat portion 35a to hold the caulking portion 22. In the present embodiment, the holding part 35d is tapered toward an outer periphery of the ring gear 4. A part of the caulking tool 35 is shown in FIG. 19.

According to the caulking tool 35 in the present embodiment, in the "caulking step," as shown in FIG. 19, the caulking portion 22 is pressed in an axial direction of the ring gear 4 so that the caulking portion 22 is pressed by the flat portion 35a while a part of the caulking portion 22 flows along the slant portion 35b to be away from each notch 13 in the opposite direction, and thereby a material forming the caulking portion 22 is filled in each notch 13. In other words, the caulking portion 22 is subjected to swaging by the flat portion 35a and filled in each notch 13. Therefore, when the caulking potion 22 is pressed in the axial direction of the ring gear 4 by the caulking tool 35, the pressing force hardly acts on a bottom part 13c of each notch 13. Thereby, when caulking, a load applied to the ring gear 4 in a radial direction thereof becomes extremely small. As a result, when the ring gear 4 is fastened to a flange 3 of a differential case 2 by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Figure 20:
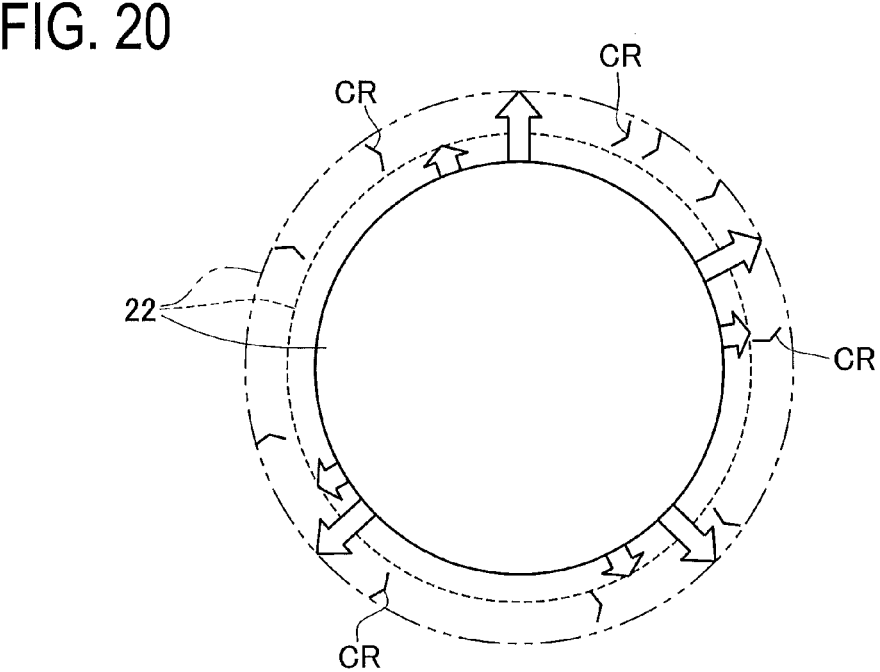
FIG. 20 is a conceptual diagram showing an extension of a material of the caulking portion in the sixth embodiment.

Further, since the caulking tool 35 in the present embodiment includes the holding portion 35d formed opposite to the slant portion 35b with respect to the flat portion 35a, the material forming the caulking portion 22 is prevented from escaping toward the outer periphery of the ring gear 4 by the holding portion 35d. Therefore, an excessive extension of the material of the caulking portion 22 is prevented, and the deformed caulking portion 22 is prevented from cracking on its outer peripheral edge. FIG. 20 is a conceptual diagram showing an extension of the material forming the caulking portion 22. The caulking portion 22 indicated with a solid circle in FIG. 20 is extremely extended its outer periphery to a position indicated with a chain double-dashed line in the figure by caulking with use of a conventional caulking tool. There is a possibility that cracks CR may occur on the outer peripheral edge of the caulking portion 22. On the other hand, the extension of the caulking portion 22 can be reduced to a position indicated with a broken line in FIG. 20 by caulking the caulking portion 22 by use of the caulking tool 35 of the present embodiment, so that a length of the outer periphery becomes relatively short. Accordingly, the cracks on the outer peripheral edge of the caulking portion 22 can be prevented.

Seventh Embodiment

A seventh embodiment illustrating a method for caulking a ring gear according to the present invention is described in detail with reference to the accompanying drawings.

Figure 21:
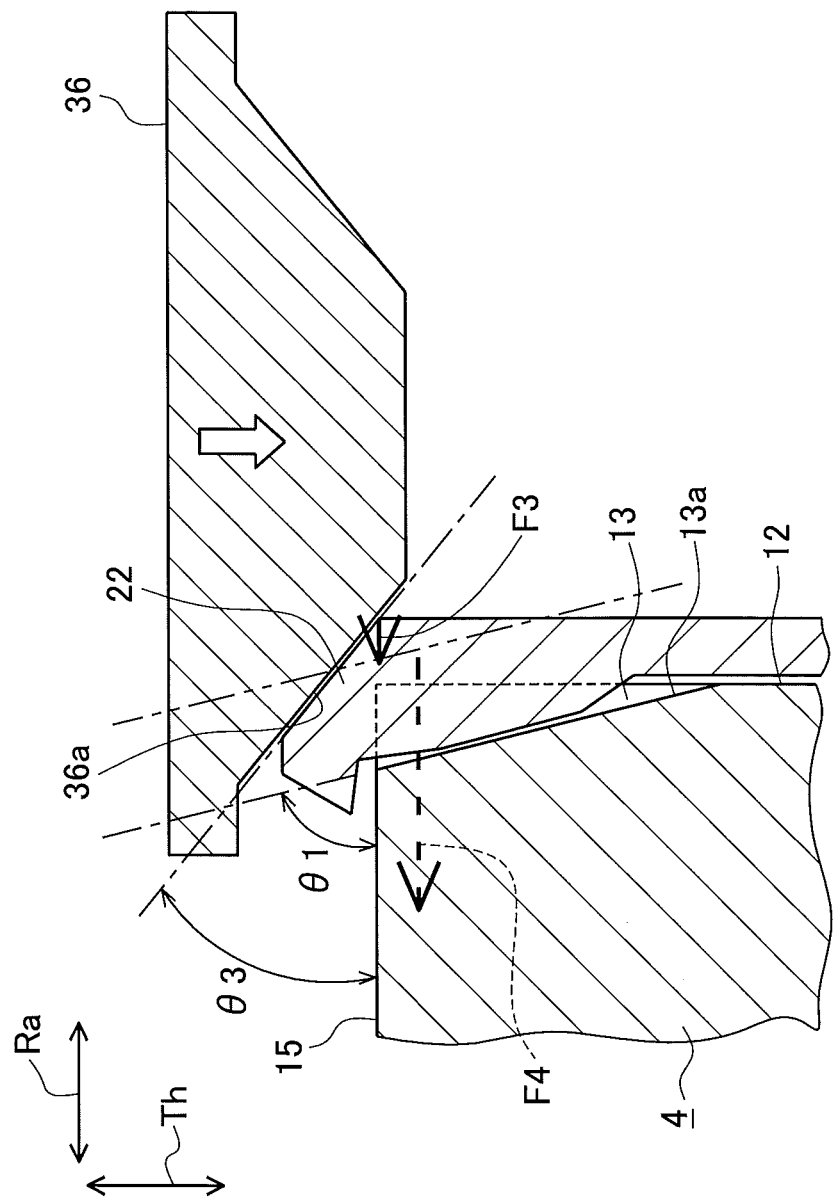
FIG. 21 is a sectional view showing a relationship among a notch of a ring gear, a caulking portion, and a caulking tool in a "caulking step" of a seventh embodiment.

While the configuration of notches 13 of a ring gear 4 in the present embodiment is similar to that of the first embodiment, a caulking method using a caulking tool 36 is different from the above-mentioned embodiments. FIG. 21 is a sectional view showing a relationship among the notches 13 of the ring gear 4, a caulking portion 22, and the caulking tool 36 in a "caulking step." The caulking tool 36 includes a slant portion 36a slanted at a predetermined angle $\theta 3$ with respect to a radial direction of the ring gear 4 to press the caulking portion 22 in the axial direction of the ring gear 4. A predetermined angle $\theta 1$ of a bottom part 13a of each notch 13 is determined larger than the predetermined angle $\theta 3$ of the slant portion 36a. Namely, a relational expression $\theta 1 > \theta 3$ is satisfied. In the "caulking step," the caulking portion 22 is pressed in the axial direction of the ring gear 4 by the slant portion 36a of the caulking tool 36 so that a material forming the caulking portion 22 is filled in each notch 13. A part of the caulking tool 36 is shown in FIG. 21.

According to the caulking method of the present embodiment, the predetermined angle $\theta 1$ of the bottom part 13a of each notch 13 is larger than the predetermined angle $\theta 3$ of the slant portion 36a of the caulking tool 36. Therefore, in the "caulking step," when the caulking portion 22 is pressed in the axial direction of the ring gear 4 by the caulking tool 36 as shown in FIG. 21, a component F3 (indicated with a bold line with an arrow in the figure) of the pressing force applied to the caulking portion 22 by the slant portion 36a in the radial direction of the ring gear 4 becomes relatively small. This component F3 of the pressing force is small compared to a component F4 (indicated with a bold broken line with an arrow in the figure) in a case that the predetermined angle $\theta 3$ of the slant portion 36a is determined as same as the predetermined angle $\theta 1$ of the bottom part 13a as indicated with a chain double-dashed line in FIG. 21. Thereby, when caulking, a load applied to the ring gear 4 in the radial direction thereof becomes relatively small. Further, in the present embodiment, the bottom part 13a of each notch 13 is slanted at the predetermined angle $\theta 1$ which is larger than the conventional art with respect to the radial direction of the ring gear 4. Therefore, when the caulking portion 22 is pressed by the caulking tool 36, a component of the pressing force applied to the bottom part 13a of each notch 13 becomes smaller than the component applied to the conventional notch. As a result, when the ring gear 4 is fastened to a flange 3 of a differential case 2 by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Eighth Embodiment

An eighth embodiment illustrating a method for caulking a ring gear according to the present invention is described in detail with reference to the accompanying drawings.

Figure 22:
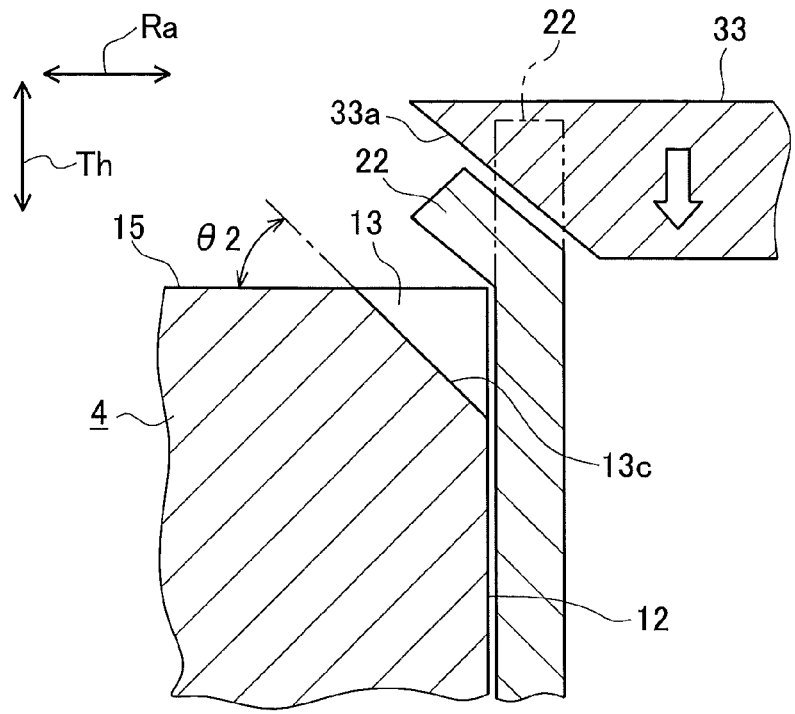
FIG. 22 is a sectional view showing a relationship among a notch of a ring gear, a caulking portion, and a caulking tool in a "pressing step" of an eighth embodiment.

While the configuration of notches 13 of a ring gear 4 in the present embodiment is similar to that of the conventional art, a caulking method using a caulking tool in the present embodiment is different from the above-mentioned embodiments. FIG. 22 is a sectional view showing a relationship among the notches 13 of the ring gear 4, a caulking portion 22, and a caulking tool 33 in a "pressing step" configuring a "caulking step." FIG. 23 is a sectional view showing a relationship among the notches 13 of the ring gear 4, the caulking portion 22, a caulking tool 37, and others in a "diverting step" configuring the "caulking step."

As shown in FIG. 22, in the "pressing step," the caulking portion 22 is pressed in an axial direction of the ring gear 4 by use of a first caulking tool 33 so that an end portion of the caulking portion 22 is deformed toward each notch 13 of the ring gear 4. In this "pressing step," the first caulking tool 33 is moved until the end of the caulking portion 22 comes close to each notch 13.

Herein, the first caulking tool 33 has a taper surface 33a to be in contact with the end of the caulking portion 22 as shown in FIG. 22. The end of the caulking portion 22 is pressed by the taper surface 33a so that the end portion of the caulking portion 22 is deformed toward each notch 13 of the ring gear 4. A part of the first caulking tool 33 is shown in FIG. 22.

Figure 23:
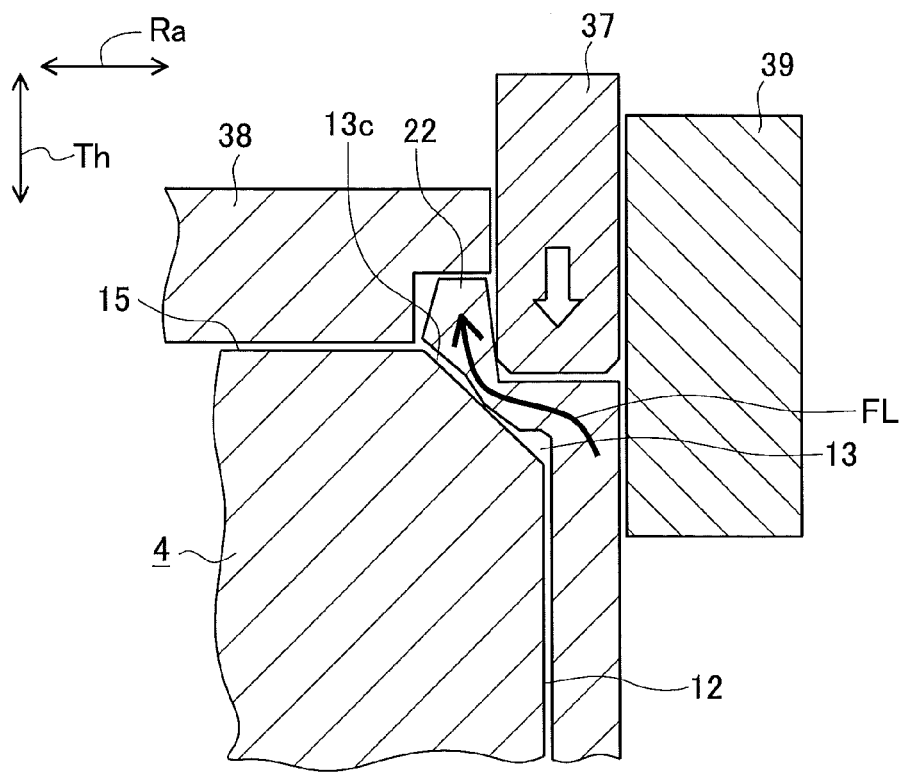
FIG. 23 is a sectional view showing a relationship among the notch of the ring gear, the caulking portion, and the caulking tool in a "diverting step" of the eighth embodiment.

After that, in a "diverting step," the caulking portion 22 is further pressed by use of a second caulking tool 37 by a diverting method as shown in FIG. 23, and thereby a material forming the caulking portion 22 is filled in each notch 13.

Diverting dies 38 and 39 are placed on the ring gear 4 to cover each notch 13 and the caulking portion 22. The diverting dies 38 and 39 create a space inside, and a part of the caulking portion 22 is accommodated in the space. The second caulking tool 37 is held between the diverting dies 38 and 39 in a movable manner for pressing the caulking portion 22 accommodated in the space. FIG. 23 shows the second caulking tool 37 and parts of the diverting dies 38 and 39.

According to the caulking method of the present embodiment, the end portion of the caulking portion 22 is pressed by the taper surface 33a of the caulking tool 33 in the "pressing step," and thereby the end portion of the caulking portion 22 is temporarily deformed toward each notch 13 of the ring gear 4. After that, in the "diverting step," the caulking portion 22 is pressed by the second caulking tool 37 to be diverted to the space between the diverting dies 38 and 39 so that the material forming the deformed caulking portion 22 is filled in each notch 13. Therefore, in the "diverting step," when the caulking portion 22 is pressed by the second caulking tool 37, a part of the material of the caulking portion 22 is diverted in the space between the diverting dies 38 and 39 as indicated with a bold line with an arrow FL, and thereby the pressing force inside the space is reduced. Thus, when caulking, a load applied to the ring gear 4 in a radial direction thereof becomes extremely small. As a result, when the ring gear 4 is fastened to a flange 3 of a differential case 2, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Ninth Embodiment

A ninth embodiment illustrating a caulking tool for use in a method for caulking a ring gear according to the present invention is described in detail with reference to the accompanying drawings.

While the caulking method similar to the seventh embodiment is adopted in the present embodiment, the configuration of the present embodiment is different from that of the seventh embodiment in a manner that a caulking tool 40 is adopted as an improved version of the caulking tool 36 of the seventh embodiment.

Figure 24:
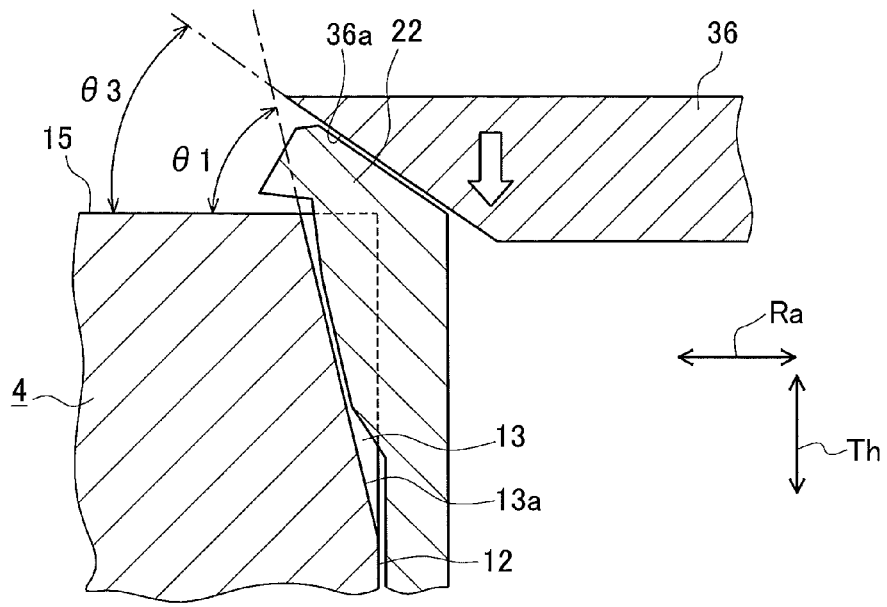
FIG. 24 is a sectional view of a comparative example showing a relationship among a notch of a ring gear, a caulking portion, and a caulking tool in a "caulking step" of a ninth embodiment.

FIG. 24 is a sectional view showing a relationship among notches 13 of a ring gear 4, a caulking portion 22, and a caulking tool 36, shown as a comparative example similar to the seventh embodiment. In the present case, the caulking portion 22 is pressed by the caulking tool 36, and each notch 13 is closed at the bottom dead center of the caulking tool 36. At this time, friction between a slant portion 36a of the caulking tool 36 and the caulking portion 22 becomes the largest, and thereby the pressing force applied to a bottom part 13a of each notch 13 sharply increases. If this pressing force can be reduced, the load applied to the ring gear 4 in a radial direction thereof can further be reduced.

Figure 25:
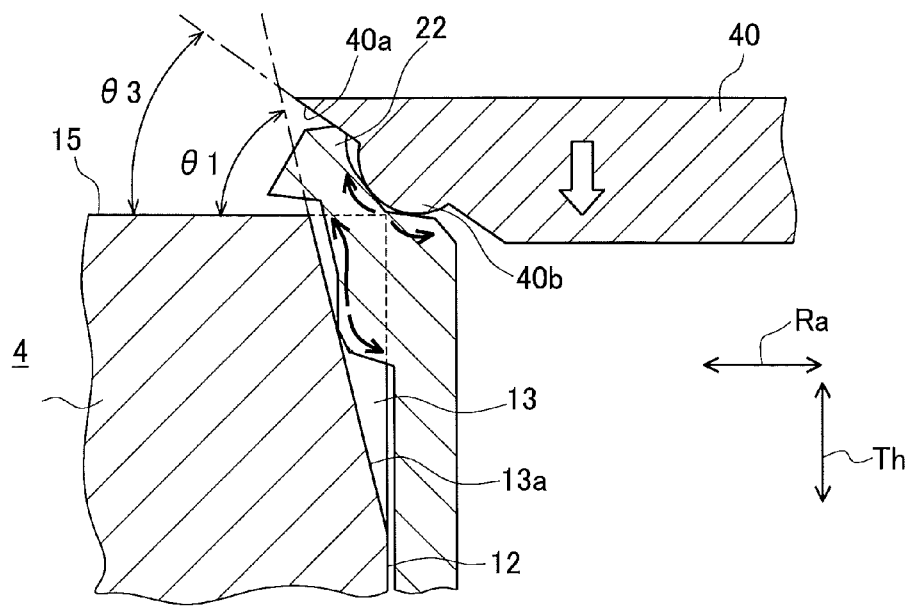
FIG. 25 is a sectional view showing a relationship among a notch of a ring gear, a caulking portion, and a caulking tool in the "caulking step" of the ninth embodiment.

For the above purpose, a caulking tool 40 which is an improved version of the caulking tool 36 is adopted in the present embodiment. FIG. 25 is a sectional view showing a relationship among the notches 13 of the ring gear 4, the caulking portion 22, and the caulking tool 40. The caulking tool 40 includes a slant portion 40a slanted at a predetermined angle θ3 with respect to the radial direction of the ring gear 4 and a plurality of raised portions 40b protruding from the slant portion 40a as corresponding to the plurality of notches 13 of the ring gear 4 to press the ring gear 4 in the axial direction thereof. Each raised portion 40b has a shape conforming to a shape of each notch 13 and a size smaller than that of each notch 13. Specifically, each raised portion 40b is of a hemispherical shape and has a curved outer surface. A part of the caulking tool 40 is shown in FIG. 25.

According to the caulking tool 40 of the present embodiment, the similar effects with the caulking tool 36 in the seventh embodiment can be obtained. In addition to this, when the caulking portion 22 is pressed by the caulking tool 40 and each notch 13 is closed at the bottom dead center of the caulking tool 40, each raised portion 40b of the slant portion 40a is in point contact with the caulking portion 22. Thereby, the friction between the caulking portion 22 and the raised portions 40b becomes small, and a material forming the caulking portion 22 flows in the vicinity of the contact parts. Also in the vicinity of a bottom part 13a of each notch 13, the material of the caulking portion 22 flows in. Thereby, the pressing force applied to the bottom part 13a is reduced. Since the pressing force is reduced as described, the load applied to the ring gear 4 in the radial direction thereof can be further reduced. As a result, when the ring gear 4 is fastened to a flange 3 of a differential case 2 by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Tenth Embodiment

A tenth embodiment illustrating a ring gear to be fastened by a caulking method according to the present invention is described in detail with reference to the accompanying drawings.

The present embodiment is different from the above-mentioned embodiments regarding the configuration of a plurality of notches formed in a ring gear 4.

Figure 26:
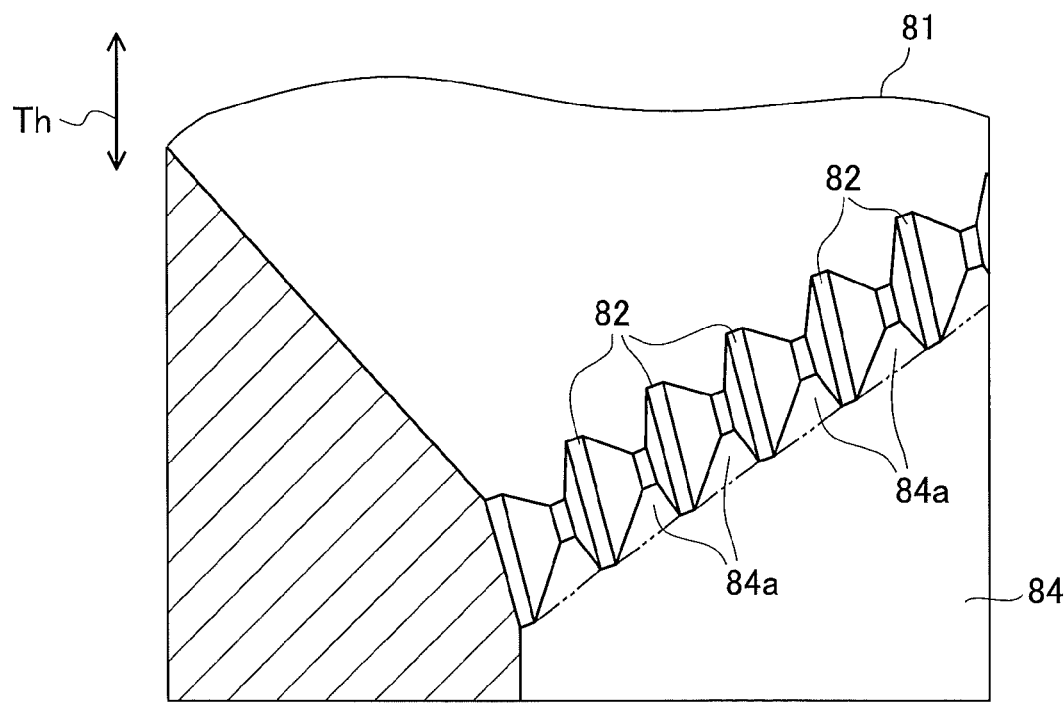
FIG. 26 is a partial perspective view showing an inner peripheral surface side of a conventional ring gear in a tenth embodiment.

FIG. 26 is a partial perspective view showing a side of an inner peripheral surface 84 of a ring gear 81 in a conventional art. In FIG. 26, in between a plurality of notches 82 which are formed on an inner peripheral edge of the ring gear 81, clearance surfaces 84a of almost triangular shape are formed to be on the same plane surface with the inner peripheral surface 84 of the ring gear 81. The clearance surfaces 84a are the region where a load is applied in a radial direction of the ring gear 81 from a differential case when a caulking portion of the ring gear 81 is caulked. If each of the clearance surfaces 84a can be made small, the load applied to the ring gear 81 in the radial direction thereof can be reduced.

Figure 27:
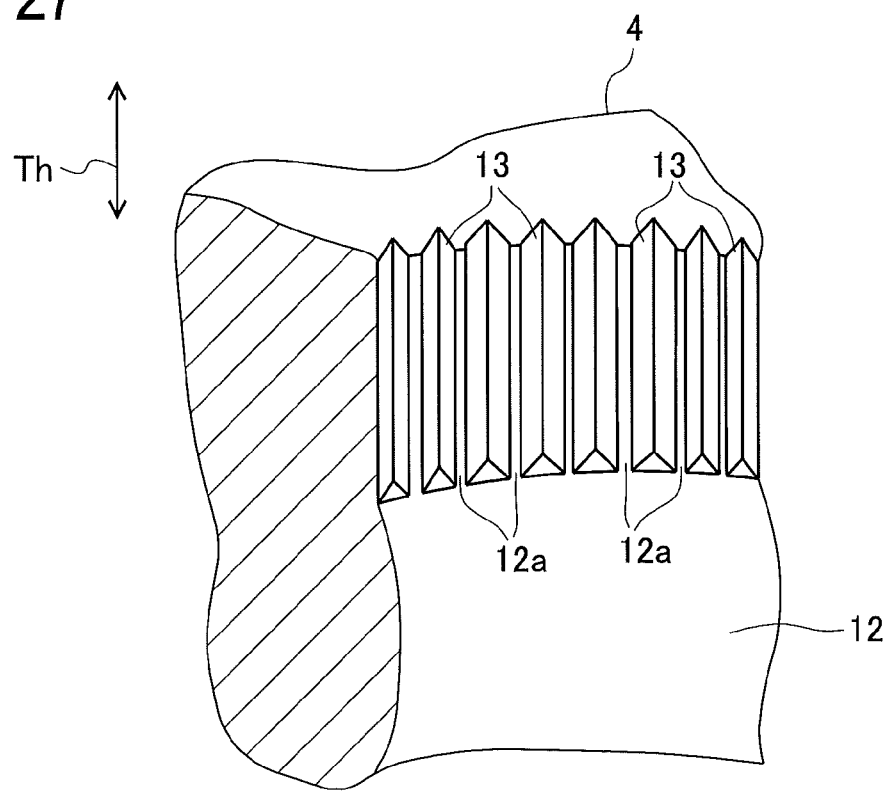
FIG. 27 is a partial perspective view of a ring gear seen from a press-fitting surface side in the tenth embodiment.

To achieve the above purpose, a shape of each notch of the ring gear 4 is made improvements in the present embodiment. FIG. 27 is a partial perspective view of a ring gear 4 when seen from a side of a press-fitting surface 12 in the present embodiment. As shown in FIG. 27, each of the plurality of notches 13 of the ring gear 4 is of a V-shaped groove-like shape in section, extending at a uniform depth along an axial direction and a uniform width on the press-fitting surface 12 of the ring gear 4. Each of the clearance surfaces 12a formed in between the plurality of notches 13 have a narrow width. In this manner, each clearance surface 12a is made as small as possible.

According to the ring gear 4 of the present embodiment, the clearance surfaces 12a of the notches 13 are made small, and thereby the load applied to the clearance surfaces 12a by the differential case is reduced when the ring gear 4 is fastened with its caulking portion by caulking. As a result, when the ring gear 4 is fastened to a flange 3 of the differential case by caulking, deformation and distortion of teeth 11 of the ring gear 4 can be reduced. Thereby, the ring gear 4 can maintain a suitable gear contact pattern with respect to a counterpart gear, and thus exhibit improved noise and oscillation properties.

Eleventh Embodiment

An eleventh embodiment illustrating a ring gear to be fastened by a caulking method according to the present invention is described in detail with reference to the accompanying drawings.

Figure 28:
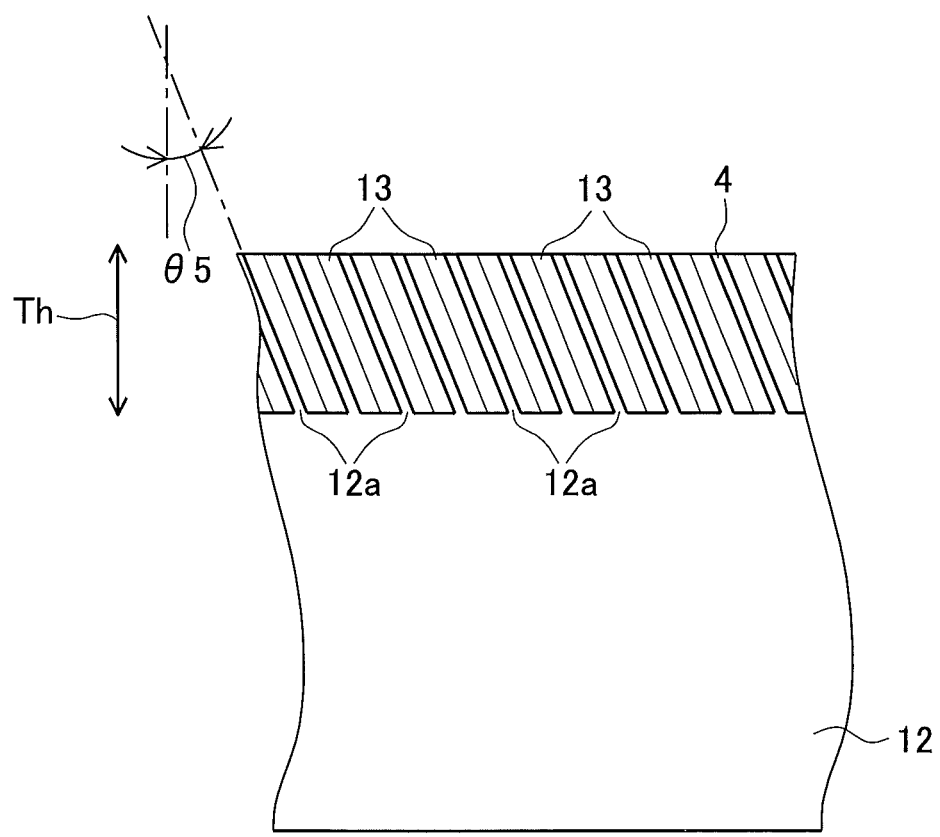
FIG. 28 is a partial front view of a ring gear seen from a press-fitting surface side in an eleventh embodiment.

The present embodiment is different from the above tenth embodiment regarding the configuration of the plurality of notches formed in a ring gear 4. FIG. 28 is a partial front view of the ring gear 4 when seen from a side of a press-fitting surface 12 in the present embodiment. As shown in FIG. 28, in the present embodiment, a plurality of notches 13 formed in parallel to each other on the press-fitting surface 12 of the ring gear 4 are slanted at a predetermined angle θ5 with respect to an axial direction. This is different from the configuration of the tenth embodiment in which the plurality of notches 13 is formed in parallel with the axial direction. The configuration of the present embodiment is similar to that of the tenth embodiment in a manner that each of the notches 13 is of a V-shaped groove-like shape in section, formed extending at a uniform depth and a uniform width, and each clearance surface 12a in between the notches 13 is formed narrow in width.

According to the ring gear 4 of the present embodiment, in addition to the operational effects of the tenth embodiment, the plurality of notches 13 are slanted at the predetermined angle θ5 with respect to the axial direction, and thereby when the ring gear 4 is press-fitted to a flange 3 of a differential case and fixed, mechanical resistance by the notches 13 in the axial direction is increased. As a result, fastening force of the ring gear 4 and the flange 3 in the axial direction can be strengthened, and the ring gear 4 and the flange 3 can be hardly separated.

The present invention is not limited to the above-mentioned embodiments and can be partially modified as appropriate without departing from the essential scope of the invention.

For example, in the ninth embodiment, the raised portions 40b formed in the slant portion 40a of the caulking tool 40 are of hemispherical shape. Alternatively, the raised portion may be of half prorate spheroid shape.

INDUSTRIAL APPLICABILITY

The present invention may be applied to a differential sub-assembly used for a power transmission mechanism of a vehicle and manufacturing thereof.

REFERENCE SIGNS LIST

1 Differential sub-assembly
2 Differential case
3 Flange
4 Ring gear
11 Teeth
12 Press-fitting surface (Inner peripheral surface)
12a Clearance surface
13 Notch (Caulked portion)
13a Bottom part
13b Bottom part
14 One end surface
15 End surface
21 Outer peripheral surface
22 Caulking portion
23 Bank
31 Caulking tool
32 Caulking tool
32a Pressing portion
32b Holding portion
33 First caulking tool
33a Taper surface
34 Second caulking tool
34a Pressing potion
34b Holding portion
35 Caulking tool
35a Flat portion
35b Slant portion
35c Protrusion
35d Holding portion
36 Caulking tool
36a Slant portion
37 Second caulking tool
38 Diverting die
39 Diverting die
40 Caulking tool
40a Slant portion
40b Raised portion
θ1 Predetermined angle
θ3 Predetermined angle
θ5 Predetermined angle

The invention claimed is:

1. A method for caulking a ring gear press-fitted on an outer periphery of a flange of a differential case constituting a differential sub-assembly, the ring gear being fastened by use of a caulking tool to caulk a caulking portion formed on at least one of both ends of the flange in an axial direction thereof to a caulked portion formed on at least one of both ends of the ring gear in an axial direction thereof, wherein the caulked portion is a plurality of notches formed along an inner peripheral edge of the ring gear, each notch including a bottom part slanted at a predetermined angle with respect to a radial direction of the ring gear, the caulking tool includes: a first caulking tool; a second caulking tool: and a diverting die, the first caulking tool being formed with a slanted taper surface approximated to the slanted bottom part of the each notch, the diverting die creating a space to accommodate the caulking portion therein, and the second caulking tool being held by the diverting die in a movable manner and formed with a flat surface extending along a direction vertical to the axial direction of the ring gear, and the caulking method includes:

a pressing step of pressing an end portion of the caulking portion in the axial direction of the ring gear by use of the taper surface of the first caulking tool so that the end portion is deformed toward the each notch until the end portion comes close to the notches; and a diverting step of, after the pressing step, further pressing the caulking portion by use of the flat surface of the second caulking tool in a direction similar to a pressing direction of the first caulking tool in a state that the caulking portion is accommodated in the space created by the diverting die so that a material forming the caulking portion is filled in notch.

2. A method for caulking a ring gear press-fitted on an outer periphery of a flange of a differential case constituting a differential sub-assembly, the ring gear being fastened by use of a caulking tool to caulk a caulking portion formed on at least one of both ends of the flange in an axial direction thereof to a caulked portion formed on at least one of both ends of the ring gear in an axial direction thereof, wherein the caulked portion is a plurality of notches formed along an inner peripheral edge of the ring gear, each notch including a bottom part slanted at a predetermined angle with respect to a radial direction of the ring gear, the caulking tool includes a first caulking tool and a second caulking tool, the first caulking tool being formed with a slanted taper surface approximated to the slanted bottom part of the each notch, the second caulking tool being formed with: a flat surface extending along a direction vertical to the axial direction of the ring gear; a pressing part for pressing the caulking portion in the axial direction of the ring gear: and a holding part for holding a part of the caulking portion formed opposite to a part to be engaged with the notches, and the caulking method includes:

a first pressing step of pressing an end portion of the caulking portion by use of the taper surface of the first caulking tool in the axial direction of the ring gear so that the end portion of the caulking portion is deformed toward the each notch of the ring gear and deformation is terminated in a state that the end portion is not in contact with the notches; and a second pressing step of, after the first pressing step, holding the part of the caulking portion formed opposite to the part to be engaged with each notch by use of the holding part of the second caulking tool and further pressing the caulking portion by the flat surface of the pressing part in a direction similar to a pressing direction of the first caulking tool so that a material forming the caulking portion is filled in each notch.

* * * * *